United States Patent
Kamijo et al.

(10) Patent No.: US 6,542,712 B2
(45) Date of Patent: Apr. 1, 2003

(54) METHOD AND APPARATUS FOR TONER IMAGE FIXING USING A SHEET-SHAPED PRESSING MEMBER

(75) Inventors: Masahiko Kamijo, Kanagawa-ken (JP); Hidehiko Fujiwara, Tokyo (JP); Kota Takenaka, Kanagawa-ken (JP); Osamu Kiuchi, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/897,155

(22) Filed: Jun. 29, 2001

(65) Prior Publication Data
US 2002/0061211 A1 May 23, 2002

(30) Foreign Application Priority Data

Jun. 30, 2000 (JP) .......... 2000-199543
Jun. 30, 2000 (JP) .......... 2000-199550
Jun. 30, 2000 (JP) .......... 2000-199745
May 29, 2001 (JP) .......... 2001-160352

(51) Int. Cl.⁷ .......... G03G 15/20
(52) U.S. Cl. .......... 399/328; 399/122
(58) Field of Search .......... 399/320, 328, 399/329, 330, 331, 333, 122; 219/216; 252/502

(56) References Cited

U.S. PATENT DOCUMENTS

| | | | | |
|---|---|---|---|---|
| 4,200,389 A | * | 4/1980 | Matsui et al. .......... | 399/339 |
| 5,212,529 A | * | 5/1993 | Morris et al. .......... | 399/330 |
| 5,294,373 A | * | 3/1994 | Takahashi et al. .......... | 252/502 |
| 5,485,259 A | * | 1/1996 | Uehara et al. .......... | 399/325 |
| 5,655,202 A | * | 8/1997 | Yoshimura et al. .......... | 399/330 |
| 5,708,947 A | * | 1/1998 | Kagawa et al. .......... | 399/328 |
| 5,790,931 A | * | 8/1998 | Tsuji et al. .......... | 399/328 |
| 5,809,389 A | * | 9/1998 | Tamura et al. .......... | 399/330 X |
| 5,842,100 A | * | 11/1998 | Yanashima et al. .......... | 399/328 |
| RE36,962 E | * | 11/2000 | Higashi et al. .......... | 399/328 |
| 6,151,466 A | | 11/2000 | Fujiwara .......... | 399/92 |

OTHER PUBLICATIONS

U.S. Application No. 09/431,174 filed Nov. 1, 1999.

* cited by examiner

*Primary Examiner*—Hoan Tran
(74) *Attorney, Agent, or Firm*—Cooper & Dunham LLP

(57) ABSTRACT

A fixing apparatus includes a fixing roller, a base, and a sheet-shaped pressing member. The fixing roller includes an inner heater. The base includes a mounting portion upstream from the fixing roller in a sheet transportation direction. The sheet-shaped pressing member includes a fixing side which is fixed to the mounting portion of the base and a free side downstream from the fixing side in the sheet transportation direction. The free side contacts the fixing roller with its upper surface under pressure to form a nip area. In the fixing apparatus, a recording sheet having a toner image passes through the nip area formed so as to receive heat and pressure.

123 Claims, 21 Drawing Sheets

FIG. 8
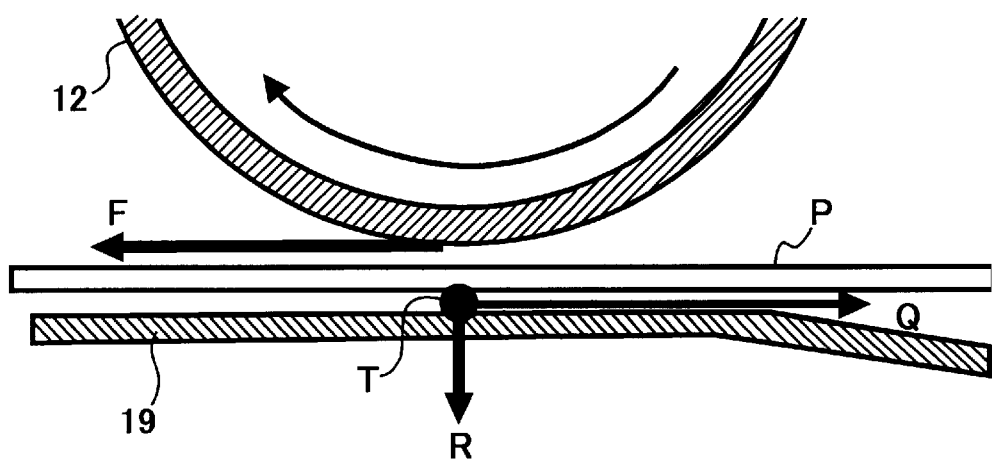
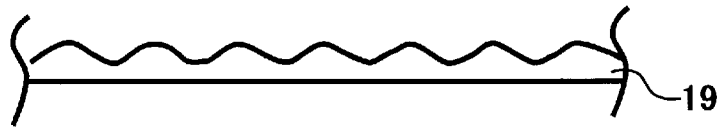
FIG. 9A
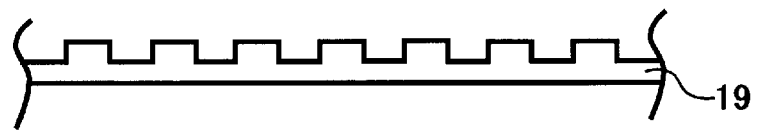
FIG. 9B
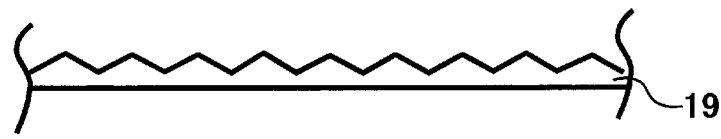
FIG. 9C
FIG. 9D

METHOD AND APPARATUS FOR TONER IMAGE FIXING USING A SHEET-SHAPED PRESSING MEMBER

BACKGROUND

1. Field

This patent specification relates to a method and apparatus for toner image fixing, and more particularly to a method and apparatus for toner image fixing using a sheet-shaped pressing member.

2. Description of Related Art

FIG. 1 shows a fixing apparatus for use in an image forming apparatus such as a copying machine, a facsimile machine, etc. The fixing apparatus of FIG. 1 includes a fixing roller 100, a pressure roller 101, a fixing heater 102, a thermo-sensor 103, a release pawl 104, a cleaning pad 105, a cleaning pad holder 106, a cleaning pad stopper 107, an entrance guide plate 108, and ejection rollers 109. The pressure roller 101 contacts under pressure with the fixing roller 100. The fixing heater 102 is arranged inside the fixing roller 100 to heat up the fixing roller 100. The thermo-sensor 103 detects a temperature of the fixing roller 100. The release pawl 104 releases a recording sheet from the fixing roller 100. The cleaning pad 105 cleans off the fixing roller 100. The cleaning pad holder 106 holds the cleaning pad 105. The cleaning pad stopper 107 is arranged downstream from the cleaning pad 105 in a rotation direction of the fixing roller 100. The entrance guide plate 108 is arranged at an entrance of the fixing apparatus from which a recording sheet is transported. The ejection rollers 109 are arranged at an exit of the fixing apparatus from which the recording sheet is ejected.

A recording sheet having a toner image is transported with the entrance guide plate 108 to a nip area formed between the fixing roller 100 and the pressure roller 101. The recording sheet is then subjected to heat and pressure in the nip area so that the toner image is melted and fixed on the recording sheet. After that, the recording sheet is ejected by the ejection rollers 109. The fixing roller 100 may allow toner particles to attach thereon time when the recording sheet passes through the nip area. However, the toner particles are cleaned off the fixing roller 100 with the cleaning pad 105.

A surface temperature of the fixing roller 100 is detected by the thermo-sensor 103. Based on the detected temperature, the fixing heater 102 is controlled to heat the fixing roller 100 by a controller (not shown).

Generally, such fixing apparatus commonly uses an infrared heater or a halogen heater as the fixing heater and includes a pair of fixing and pressure rollers. However, the pressure roller does not heat up quickly and can cause a failure of fixing. This is because the pressure roller has a relatively large heat capacity since it includes a metal core coated with a silicon rubber layer which is then covered by a releasing layer made of a Teflon tube, for example. In addition, a cost of such mechanism including the pressure roller is relatively high. Further, in this mechanism, the pressure roller needs to apply a relatively high pressure to the fixing roller in order to generate a nip area in a proper manner. This may stress and wrinkle the recording sheet.

SUMMARY

The present application describes a novel fixing apparatus in use with an image forming apparatus. In one example, a novel fixing apparatus includes a fixing roller, a base, and a sheet-shaped pressing member. The fixing roller includes an inner heater. The base includes a mounting portion upstream from the fixing roller in a sheet transportation direction. The sheet-shaped pressing member includes a fixing side which is fixed to the mounting portion of the base and a free side downstream from the fixing side in the sheet transportation direction. The free side contacts the fixing roller with its upper surface under pressure to form a nip area. In this novel fixing apparatus, a recording sheet having a toner image thereon passes through the nip area formed between the fixing roller and the pressing member so as to be subjected to heat and pressure at the nip area.

The pressing member may have a property of a leaf spring.

The mounting portion of the base may be formed to have a plane surface so that a plane including the plane surface passes through a lower portion of the fixing roller.

The pressing member may have a length in the sheet transportation direction such that an edge of the free side is downstream from the nip area.

The above-described fixing apparatus may further include a stopper for stopping a vertical movement of the pressing member. This stopper is provided at a position of the base downstream from the nip area in the sheet transportation direction so as to contact the pressing member from its back side.

The stopper may be held for movement so as to adjust a vertical position of the pressing member.

A surface of the pressing member contacting the fixing roller may be formed in a cylindrical shape in part having a curvature equal to that of the fixing roller.

A plane of the pressing member upstream from the nip area may be slanted on a tangent line at an edge point of the nip area in the upstream side thereof in the sheet transportation direction.

A plane of the pressing member downstream from the nip area may be slanted on a tangent line, or a line away from the fixing roller, at an edge point of the nip area in the downstream side thereof in the sheet transportation direction.

The pressing member may be made of resin including fluoride resin or polyimide.

The pressing member may include a heat resistant plate member coated with a fluoride resin.

The heat resistant plate member may have a property for storing heat.

The pressing member may include a foam member or a anti-static member which may include carbon particles.

The pressing member may include a polymeric material including PFA and may contain an anti-static member including carbon particles in a weight ratio of from approximately 1.2% to approximately 6.4%.

The pressing member may include a metal member or a low electrical resistance.

The pressing member may be electrically isolated or have a resistance value of $10^{10}$ Ωcm or less.

The pressing member may include a surface including a plurality of projections and depressions, which surface contacts the fixing roller.

The plurality of projections and depressions may be slanted relative to the sheet transportation direction.

The pressing member may include a surface including a plurality of slits.

The pressing member may be configured to be thinner at the nip area than other portion thereof.

The pressing member may include a plurality of grooves formed in a main scanning direction in a back surface opposite to the nip area or a plurality of holes in a surface thereof downstream from the nip area in the sheet transportation direction.

The base may include a guide portion for guiding the recording sheet to the mounting portion and the fixing roller.

The guide portion may include a guide surface which forms a step relative to the plane of the mounting portion.

The free side of the pressing member may be subjected to a process for removing burrs.

The mounting portion may include edge portions different in length in the sheet transportation direction in accordance with a distribution of temperature such that an edge portion where the temperature is low is extended more than other edge portions where the temperature is high.

The base may be made of metal plates or be molded.

The base may be molded such that a holder for rotatably holding the fixing roller and the mounting portion are integrated with the base into a single piece unit.

The fixing roller, the pressing member, and the mounting portion may be arranged in a single unit so that the apparatus is detachable from an image forming apparatus after an installation.

The above-described fixing apparatus may further include an adjusting mechanism for adjusting a fixing position of the pressing member so as to change a region of the nip area in the surface of the pressing member.

The pressing member may be detachably fixed to the mounting portion of the base.

The pressing member may be fixed to the mounting portion with detachable fixing members at both ends, out of a sheet transportation passage, of the pressing member in a longitudinal direction.

The mounting portion may include holding portions for holding both edges of the pressing member.

The present application further describes a novel fixing apparatus. In one example, a novel fixing apparatus includes a plurality of rollers, a fixing belt, and a sheet-shaped pressing member. At least one of the plurality of rollers contains a heater. The fixing belt is extended under tension among the plurality of rollers and is cyclically moved by rotation of the plurality of rollers. The sheet-shaped pressing member includes a fixing side which is fixed and a free side downstream from the fixing side in a sheet transportation direction, the free side contacting the fixing belt with its upper surface under pressure to form a nip area. In this novel fixing apparatus, a recording sheet having a toner image thereon passes through the nip area formed between the fixing belt and the pressing member so as to be subjected to heat and pressure in the nip area.

The present application further describes a novel image forming apparatus. In one example, a novel image forming apparatus includes a fixing mechanism that fixes a toner image on a recording sheet. The fixing mechanism includes a plurality of rollers, a belt, and a pressing member. At least one of the plurality of rollers contains a heater. The belt is extended under tension among the plurality of rollers and is cyclically moved by rotation of the plurality of rollers. The pressing member presses the belt and is formed in a sheet shape. The pressing member includes a fixing side which is fixed and a free side downstream from the fixing side in a sheet transportation direction. The free side contacts the belt with its upper surface under pressure to form a nip area. In this image forming apparatus, a recording sheet having a toner image thereon passes through the nip area formed between the belt and the pressing member so as to be subjected to heat and pressure in the nip area.

The present application further describes a novel method of toner image fixing. In one example, a novel method includes the steps of providing, arranging, mounting, rotating, and transporting. The providing step provides a base including a mounting portion. The arranging step arranges a roller downstream from the plane mounting portion in a sheet transportation direction. The roller contains an inner heater for heating the roller. The mounting step mounts an elastic plate including a fixing side and a free side opposite to and downstream from the fixing side in the sheet transportation direction such that the fixing side is fixed to the mounting portion and the free side is brought in contact with the roller under pressure with an upper surface of the free side to form a nip area between the roller and the elastic plate. The rotating step rotates the roller. The transporting step transports a recording sheet having a toner image thereon into the nip area so as to be subjected to heat and pressure in the nip area.

BRIEF DESCRIPTION OF THE DRAWINGS

A more complete appreciation of the disclosed embodiments and many of the attendant advantages thereof will be readily obtained as the same become better understood by reference to the following detailed description when considered in connection with the accompanying drawings, wherein:

FIG. 8 is an illustration for explaining a cause of paper jam when a recording is performed on a second side of a recording sheet having a first side already recorded;

FIGS. 9A–9D are illustrations for showing a pressing member having projections and depressions;

DETAILED DESCRIPTION OF PREFERRED EMBODIMENT

Figure 1:
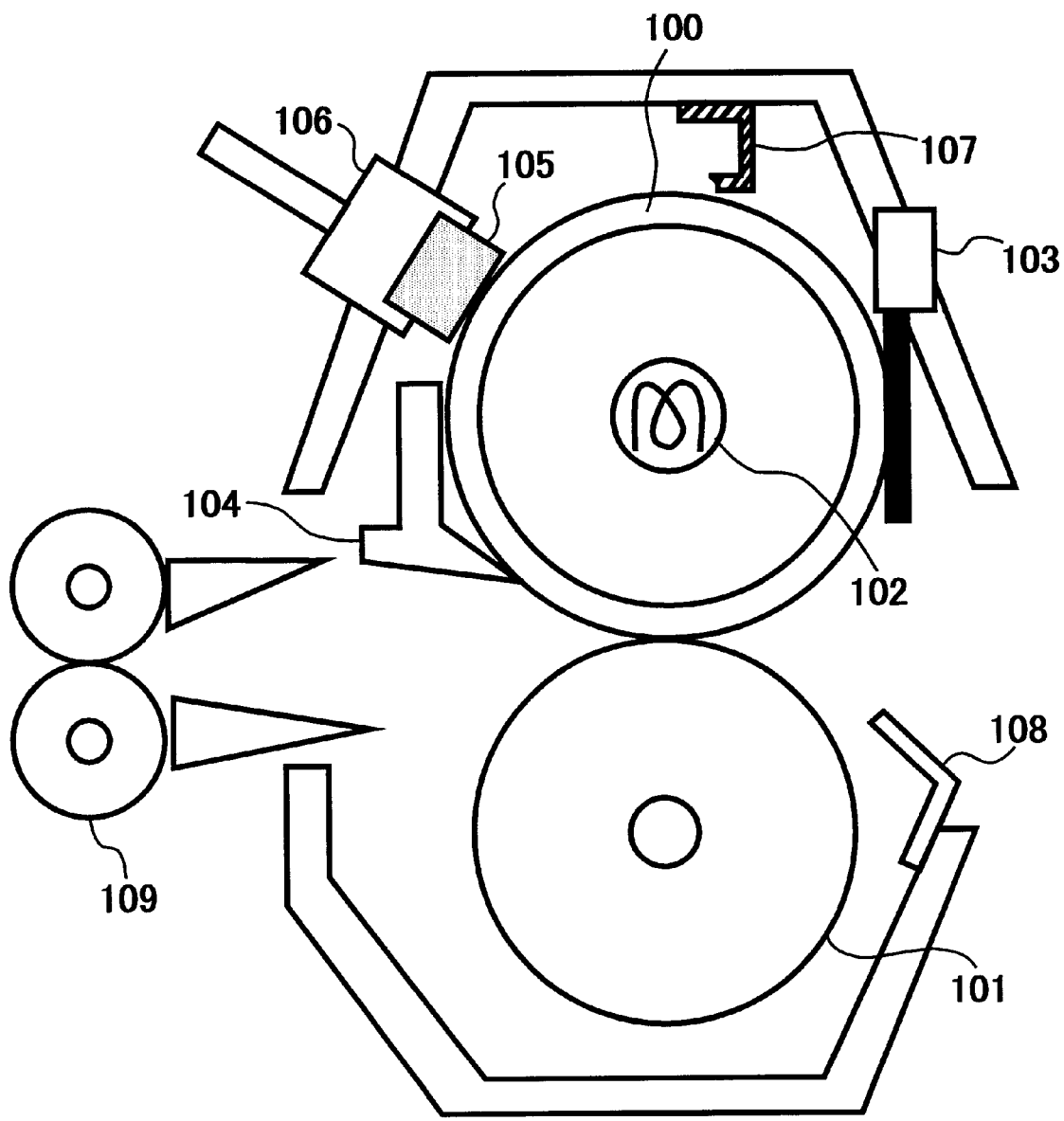
FIG. 1 is a background fixing apparatus.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 2:
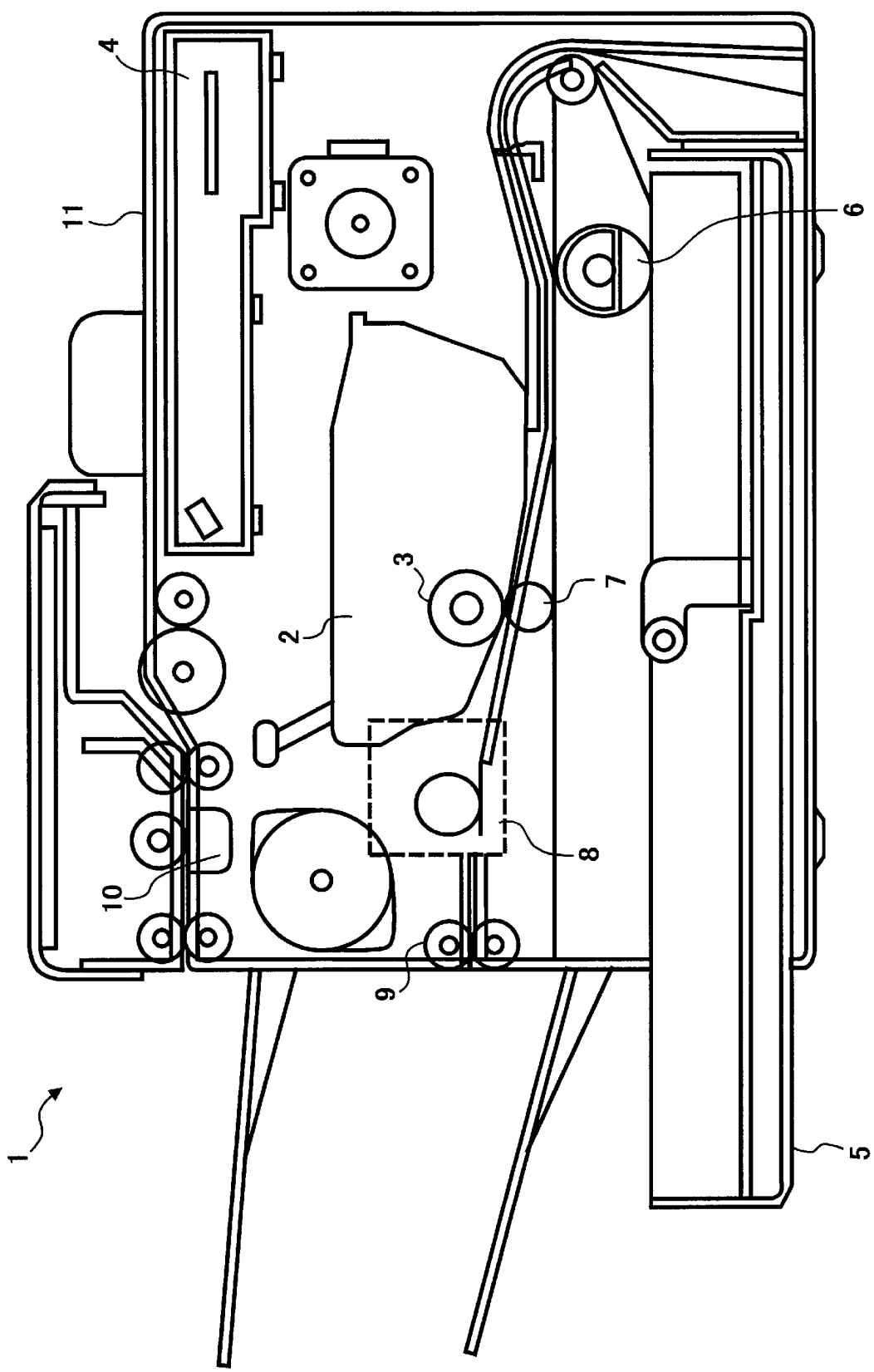
FIG. 2 is a schematic cross-sectional view of a facsimile apparatus including a fixing apparatus according to a preferred embodiment.

Referring now to the drawings, wherein like reference numerals designate identical or corresponding parts throughout the several views, and more particularly to FIG. 2 thereof, a facsimile apparatus 1 including a fixing unit according to a preferred embodiment is explained. As shown in FIG. 2, the facsimile apparatus 1 includes a process cartridge 2, an optical writing unit 4, a sheet cassette 5, a sheet feed roller 6, a transfer roller 7, a fixing unit 8, an ejection roller 9, a sensor 10, and a document bed 11. The process cartridge 2 includes various components including a photoconductor 3 to perform image forming according to an electrophotographic process. The process cartridge 2 is detachably mounted in the facsimile apparatus 1. The optical writing unit 4 scans the photoconductor 3 with laser light modulated in accordance with image data. The sheet cassette 5 contains recording sheets. The sheet feed roller 6 feeds a recording sheet to a sheet passage guiding the recording sheet to the photoconductor 3. The transfer roller 7 contacts the photoconductor 3 and transfers a toner image formed on the photoconductor 3 onto the recording sheet. The fixing unit 8 fixes the toner image on the recording sheet. The ejection roller 9 ejects the recording sheet having a fixed toner image outside the facsimile apparatus 1. The sensor 10 is a close-contact type sensor and reads an image of a document sheet. The document bed 11 has an upper surface on which a document sheet is placed facedown when it is transmitted.

A document sheet placed on the document bed 11 is transferred with a sheet transferring mechanism (not shown), passing by the sensor 10, and is ejected outside the facsimile apparatus 1. As the document sheet passes by the sensor 10, the sensor 10 optically reads an image of the document sheet and generates image data accordingly. The image data generated by the sensor 10 is sent to the optical writing unit 4 which modulates laser light in accordance with the image data and irradiates the modulated laser light on the surface of the photoconductor 3 which is evenly charged. Thereby, an electrostatic latent image is formed on the photoconductor 3. Image data may be input from an external data source (i.e., a personal computer) as an alternative to the one read with the sensor 10. The electrostatic latent image thus formed on the photoconductor 3 is developed with toner into a toner image as a visible image. The toner image is transferred with the transfer roller 7 onto a recording sheet. The recording sheet having the toner image is then transported to the fixing unit 8 which applies pressure and heat to the recording sheet so that the toner image is fixed on the recording sheet. After that, the recording sheet is ejected by the ejection roller 9 outside the facsimile apparatus 1.

Figure 3:
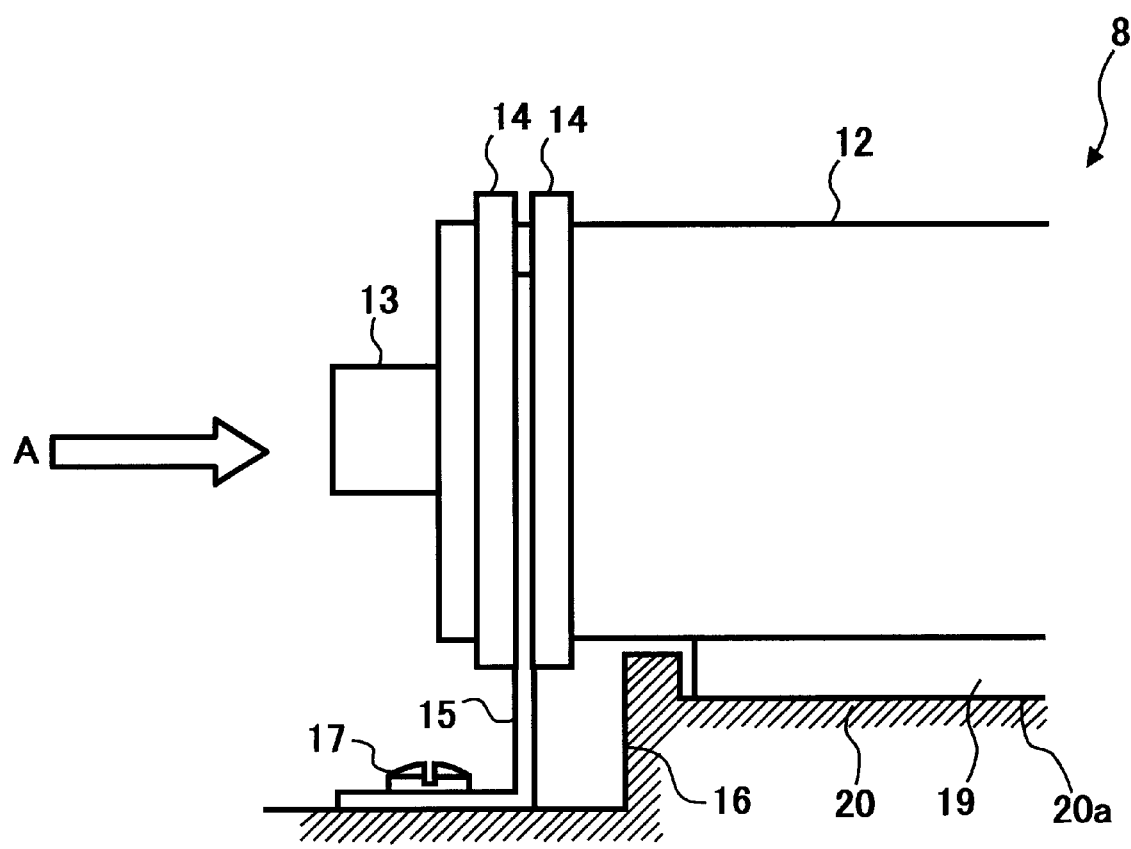
FIG. 3 is a schematic view of the fixing apparatus of FIG. 2 in part in a longitudinal direction.
Figure 4A:
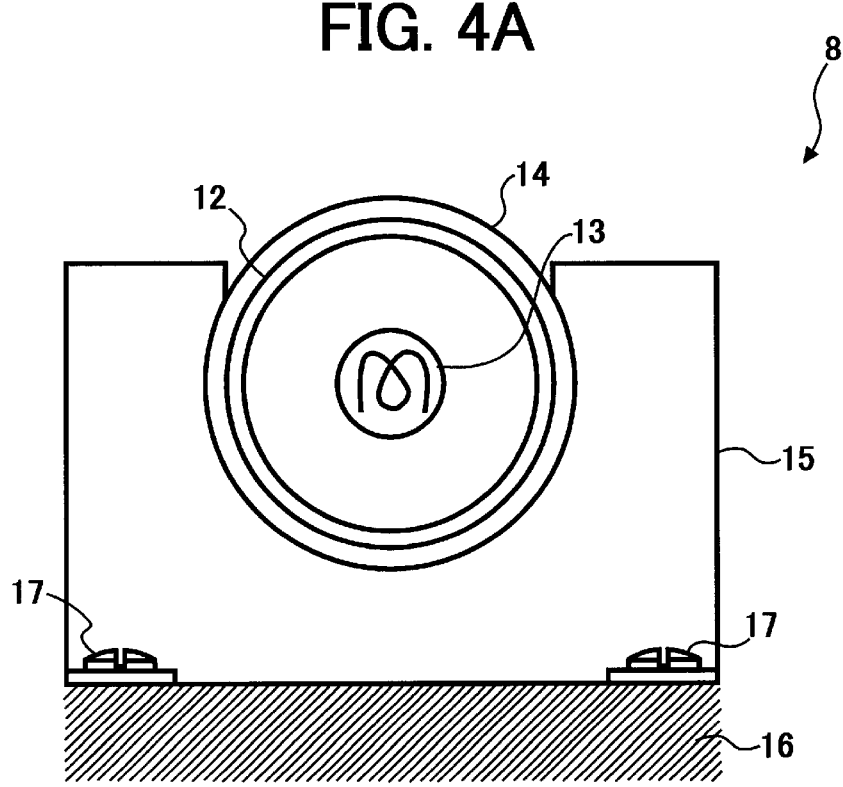
FIGS. 4A and 4B are a schematic cross-sectional view of the fixing apparatus of FIG. 3 seen from a left side in FIG. 3.
Figure 4B:
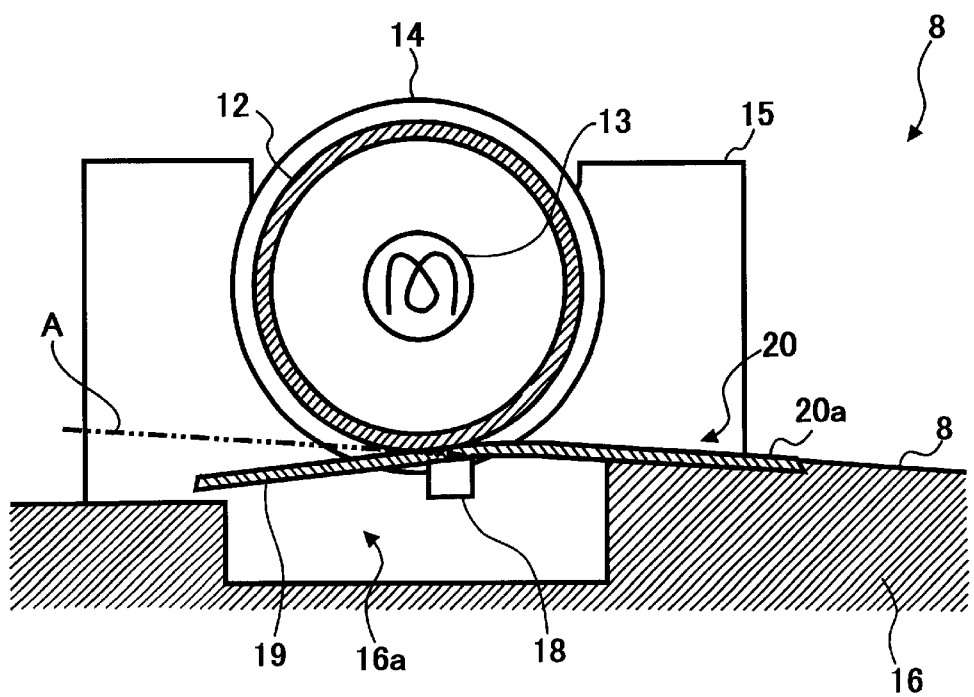

Next, an exemplary structure of the fixing unit 8 is explained with referring to FIGS. 3, 4A, and 4B. FIG. 3 shows a side of the fixing unit 8. FIG. 4A shows a side view of the fixing unit 8 as seen in a direction A indicated in FIG. 3. FIG. 4B shows a cross-sectional view of the fixing unit 8 at a center thereof as seen in the direction A indicated in FIG. 3. As shown in FIG. 3, the fixing unit 8 includes a fixing roller 12, a heater 13 provided inside the fixing roller 12, roller holders 14 for holding the fixing roller 12, a bracket 15 for supporting the roller holders 14, a base 16, screws 17 for fixing the bracket 15 to the base 16, and a pressing member 19. The fixing unit 8 further include thermo-sensors 18 (FIG. 4B). Reference numeral 20 denotes a pressing-member-mounting portion of the base 16, which has a step shape. Reference numeral 20a denotes a plane surface which is formed in the pressing-member-mounting portion 20 and to which the pressing member 19 is fixed.

The pressing member 19 is formed in a sheet shape and includes a heat-resistant member having a property of heat-resistance relative to a fixing temperature. Such a member is made of a fluoride resin such as PFA (per-fluoro-alkoxy), PTFE (poly-tetra-fluro-ethylene), or FEP (fluoro-ethylene-propylene), heat-resistant resin such as polyimide, a metal plate such as a stainless steel plate, a copper plate, or the like, or a heat-resistant member having a layer coated with a fluoride resin. In the example of FIG. 3, the pressing member 19 has a thickness of 2 mm or less.

As shown in FIG. 4B, the base 16 is provided with a hollow 16a at a place thereof facing the fixing roller 12 and the pressing-member-mounting portion 20 is formed in a step shape in the hollow 16a at an edge side upstream in a sheet transportation passage. When the base 16 is in a process of molding, the hollow 16a and the pressing-member-mounting portion 20 are formed in the base 16, as well as a lower guide portion for guiding the rear surface of the recording sheet from the transfer roller 7 to the fixing roller 12.

One side of the pressing member 19 is placed on the step-shaped pressing-member-mounting portion 20 and is adhered to the plane surface 20a with a double-sided adhesive tape so that the other side thereof is free to move up and down. That is, the fixing position of the pressing member 19 is upstream in the sheet transportation passage relative to the fixing roller 12.

Since the bracket 15 supporting the roller holders 14 is fixed on the base 16 with the screws 17, the position of the fixing roller 12 is fixed relative to the facsimile apparatus 1. The pressing-member-mounting portion 20 is formed in the base 16 such that a plane A including the plane surface 20a traverses a lower portion of the fixing roller 12, as indicated by a chain line shown in FIG. 4B. The sheet-shaped pressing member 19 is fixed to the plane surface 20a and is accordingly extended along the plane A. In the example of FIG. 3, the plane surface 20a is formed so that the pressing member 19 is positioned with a slight angle relative to the horizontal line.

Accordingly, when the fixing roller 12 is installed, it contacts the pressing member 19 under pressure. Under such a condition, a pressure applied from the pressing member 19 to the fixing roller 12 is referred to as a nip pressure. Since a spring character of a plate varies according to the thickness or the material of the pressing member 19, a position for mounting the fixing roller 12 is adjusted according to the spring characteristic of the pressing member 19 so that a preferred nip pressure is generated. When the fixing roller 12 is fixed, the free side of the pressing member 19 is caused to come close or contact an edge portion of the hollow 16a at a side downstream in the sheet transportation passage.

Although the free side of the pressing member 19 is downwardly directed, as shown in FIG. 4B, it may have a different positioning such as along the horizontal line, for example.

The thermo-sensors 18 are mounted to the back side of the pressing member 19 at both ends of the fixing roller 12 in the longitudinal direction so as to detect temperature of the nip area of the fixing roller 12.

The recording sheet sent from the transfer roller 7 is guided along the lower guide portion of the base 16 to the fixing roller 12 and is caused to pass the nip area. While passing through the nip area, the recording sheet is subjected to pressure and heat so that the toner image is melt and fixed on the recording sheet. After that, the recording sheet is ejected outside the facsimile apparatus 1 by the ejection roller 9.

In order to transport a recording sheet along the lower portion of the base 16 in a proper direction, the friction between the pressing member 19 and the back side of the recording sheet should be low. The nip pressure is equally applied to the front side and back side surfaces of the recording sheet. Consequently, a transportation force that the front side surface receives and a resistance to motion that the back side surface receives are determined by friction coefficients of the surfaces of the pressing member 19 and the fixing roller 12. In the example of FIG. 3, the pressing member 19 has a smooth surface having a friction coefficient smaller than that of the fixing roller 12. It is preferable to have a great difference in the friction coefficient between the fixing roller 12 and the pressing member 19. To achieve such a great difference in the friction coefficient, it is preferable to make the friction coefficient of the pressing member 19 low than to make the one of the fixing roller 12 high. This is because the recording sheet has the toner image on the front surface thereof which may suffer from a high friction coefficient.

The fixing unit 8 uses the sheet-shaped pressing member 19 as a member to apply pressure to the fixing roller 12 and therefore it becomes possible to effectively heat up such a member. As a result, the fixing unit 8 is heated up faster than the background fixing unit. In addition, by locating the fixing position of the pressing member 19 upstream in the sheet transportation passage relative to the fixing roller 12, the pressing member 19 receives a rotation force in a forward direction from the fixing roller 12. This avoids a deformation or a damage of the pressing member 19 due to stress from the rotation force of the fixing roller 12.

In particular, when the sheet-shaped pressing member 19 is made of metal, it has high heat conductivity which leads to a fast heat-up of the fixing unit 8. As a result, it becomes possible to make the image forming apparatus ready for the image forming operation in a relatively short time period. When the sheet-shaped pressing member 19 made of metal is coated with a fluoride resin layer, the surface friction coefficient of the pressing member 19 is reduced and, as a result, this avoids an occurrence of an erroneous transportation of the recording sheet due to friction between the pressing member 19 and the recording sheet. As an effect of this, the deposition of toner to the back surface of the recording sheet is also avoided.

Further, the pressing member 19 also serves as a guide for properly guiding the leading edge of the recording sheet to the nip area of the fixing roller 12 and therefore the recording sheet is prevented from coming into collision with the fixing roller 12, which may cause an undesirable movement of the toner image or wrinkling of the recording sheet.

By making the pressing member 19 2 mm or less thick, the pressing member 19 can contact the fixing roller 12 with an even pressure to form the nip area and therefore it avoids defective fixing or a generation of wrinkles on the recording sheet.

Also, when the fixing roller 12 is mounted to the fixing unit 8, one side of the pressing member 19 is caused to contact or come close to the step portion of the hollow 16a which is downstream from the nip area in the sheet transportation passage. So, the pressing member 19 would not be unduly lowered when the recording sheet passes through the nip area. As a result, the width of the nip area can properly be maintained and the pressing member 19 can be prevented from undue deformation.

Also, with the above structure, it becomes possible to mount the thermo-sensor 18 to a position close to the nip area so that the thermo-sensor 18 can detect the fixing temperature in an accurate manner.

In addition, transportation failures due to contact of the recording sheet to burrs made on the pressing member 19 from the molding process may be prevented by removing such a burr, particularly on the edge of the side of the pressing member 19 downstream from the nip area in the sheet transportation passage.

Figure 5A:
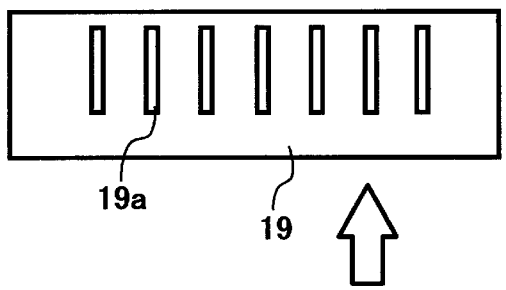
FIGS. 5A–5H are illustrations for explaining slits, notches, and cuts made in a surface of a pressing member of the fixing apparatus of FIG. 3.

Next, several examples of the sheet-shaped pressing member 19 are explained with referring to FIGS. 5A–11. These examples have a plurality of cuts in various patterns different from each other, as shown in FIGS. 5A–5H. In FIGS. 5A–5H, an arrow indicates the direction in which the recording sheet is transported. FIG. 5A shows a pressing member 19 that has a plurality of slits 19a parallel to the sheet transportation passage and FIG. 5B shows a plurality of comb-like-shaped notches 19b parallel to the sheet transportation passage.

With the slits 19a or notches 19b, the pressing member 19 contacts the recording sheet at a smaller area and therefore the friction force between them is reduced. As a result, the recording sheet is properly transferred by the friction force between the fixing roller 12 and the recording sheet towards the ejection roller 9. If the nip pressure varies at some points of a solid member 19, this may affect the nip pressure elsewhere. However, with the slits 19a or the notches 19b, such local variations in pressure do not affect the nip pressure across the entire member 19.

Figure 5E:
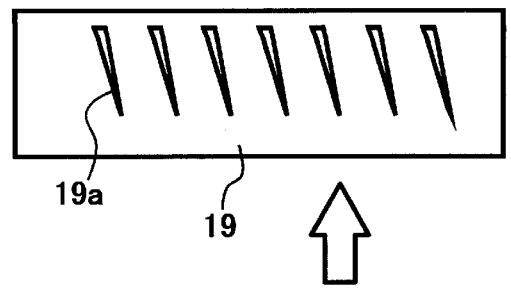
Figure 5B:
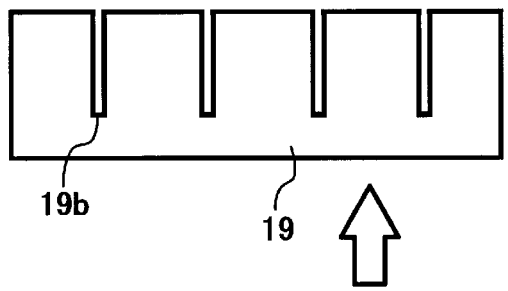
Figure 5F:
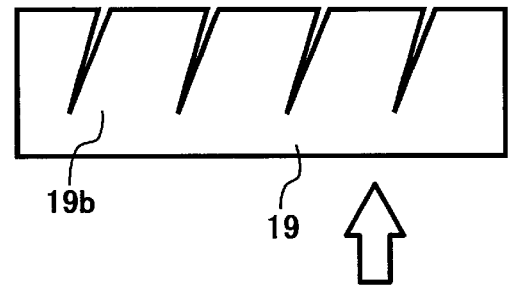
Figure 5C:
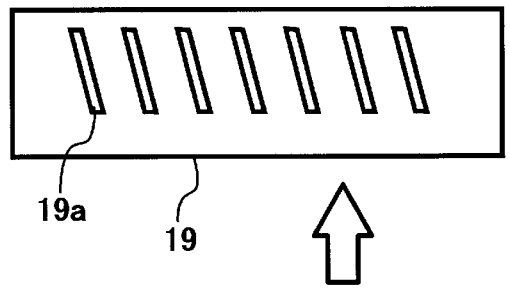

FIG. 5C shows the pressing member 19 including the slits 19a having a variation in shape, that is, angled slits. FIG. 5D shows the pressing member 19 including the notches 19b which are angled, as is the case with FIG. 5C. Likewise, another variation of the slits 19a formed in a long cuneiform shape is shown in FIG. 5E. Another variation of the notches 19b formed in a long cuneiform shape is shown in FIG. 5F. With these slits 19a or the notches 19b shown in FIGS. 5C–5F, it becomes possible to ensure good contact between the recording sheet and the fixing roller 12.

Figure 5G:
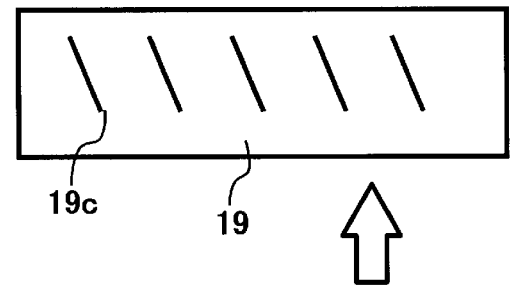
Figure 5D:
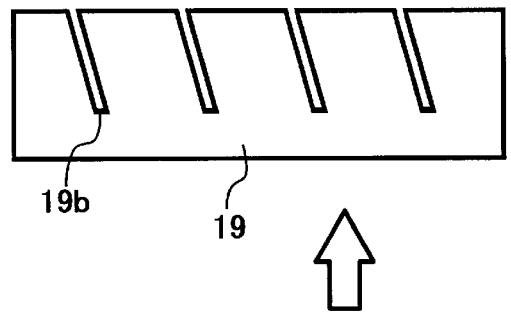
Figure 5H:
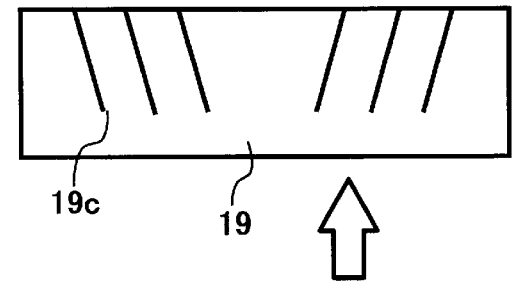

FIG. 5G shows the pressing member 19 including a plurality of angled cuts 19c. Likewise, FIG. 5H shows the pressing member 19 including a plurality of angled cuts 19c which are extended in a fan-like-shape from an intermediate part of the member 19 to the edge downstream in the direction of the sheet transportation passage.

Figure 6A:
FIGS. 6A–6D and 7 are illustrations for explaining several different structures of the pressing member.

FIG. 6A shows the pressing member 19 that includes a bubble-bearing polyimide member capable of storing heat to thereby more easily maintain the temperature of the pressing member 19.

Figure 6B:
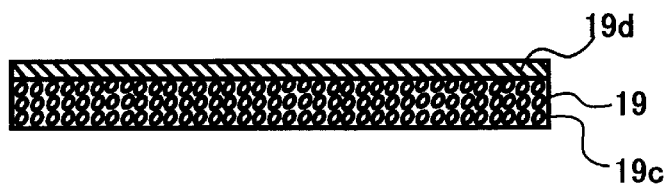

FIG. 6B shows the pressing member 19 that includes a base 19e coated with a fluoride resin 19d or poly-tetra-fluoro-ethylene (i.e., Teflon). This structure reduces the tendency of toner to attach to the pressing member 19 so that the recording sheet is kept free of toner marks. When the pressing member 19 is made of fluoride resin, the recording sheet underside is also free from toner marks as is the case with the above.

Figure 6C:
Figure 6D:

FIG. 6C shows the pressing member 19 that includes a hollow at a middle part of the back surface so that the thickness is made smaller at the nip area. Likewise, the pressing member 19 shown in FIG. 6D includes a plurality of grooves in parallel at a middle part of the back surface, which is close to the nip area, in the longitudinal direction of the pressing member 19, that is, in the main scanning direction. With the structure shown in FIG. 6C or 6D, the pressing member 19 is heated up in a relatively short time period, particularly at an area close to the nip area. In addition, these structures increase resiliency of the pressing member 19 so as to easily hold the nip area with a desired width.

Figure 7:
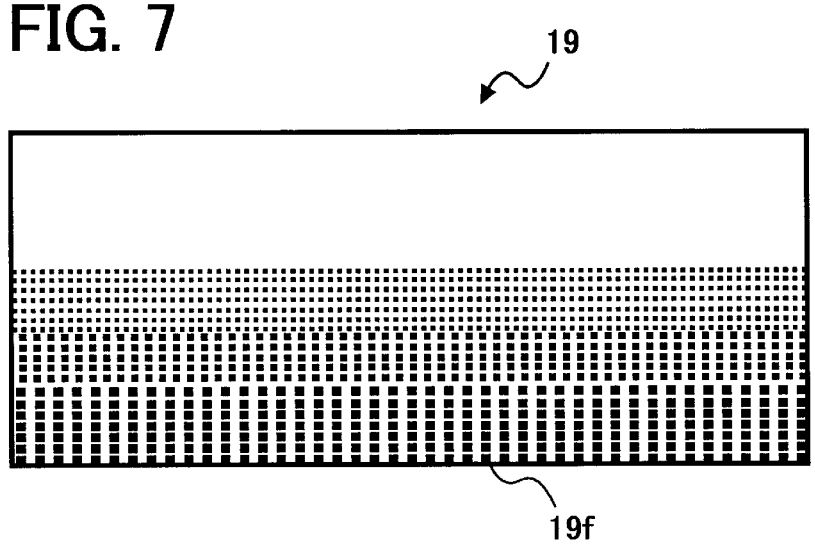

FIG. 7 shows another cutting pattern of the pressing member 19 which includes a plurality of holes 19f. As shown in FIG. 7, the holes 19f are formed in a region from the edge upstream in the sheet transportation passage to an area close to the nip area, and the holes 19f become larger (or more dense) closer to the upstream edge.

With the structure of FIG. 7, the pressing member 19 contacts the recording sheet with a smaller area before the nip area so that the recording sheet is not quickly heated up before reaching the nip area. Consequently, a sheet jam in the nip area is prevented. That is, if the recording sheet is heated up much before the nip area, it may be bent and is prone to cause a jam when pressed by the fixing roller 12. The size or density arrangement of the holes 19f allows the recording sheet to be slowly heated up. The holes 19f may be formed in the back surface of the pressing member 19.

Recording on the back surface of the recording sheet can be used, e.g., in order to save recording sheets. The recording sheet, however, increases its tendency to cause a paper jam during the fixing process by the back surface recording. FIG. 8 shows a relationship between the recording sheet and forces applied to the recording sheet during the back surface recording. In FIG. 8, the surface contacting the fixing roller 12 is referred to as a front surface which is a white surface and the surface facing the pressing member 19 is referred to as a back surface which is a recorded surface.

When the back surface is brought to the nip area, the toner on back surface of the recording sheet melts and consequently a surface tension R is generated between the melting toner and the pressing member 19. The surface tension R causes the melting toner to move towards the pressing member 19. Since the pressing member 19 is fixed and is not movable like a roller, the surface tension R acts as a resistance force relative to the transportation of the recording sheet. When the recorded sheet having a toner image of a relatively great size on the back surface is used for the back surface recording, the surface tension R and a resistance force Q are increased and eventually the resistance force Q becomes larger than a sheet transportation force F. This leads to a paper jam. In FIG. 8, letters T and P represent a toner particle and a paper sheet, respectively.

FIGS. 9A–9D show other exemplary cross-sectional structures of the pressing member 19, which are made in consideration of the above-described problem of the back surface recording. The pressing member 19 is provided with projections and depressions in a wave form, a teeth form, a sawtooth form, or a form of combination on the surface contacting the recording sheet, as seen in the cross-section of the pressing member 19, as shown in FIGS. 9A–9D.

Figure 10A:
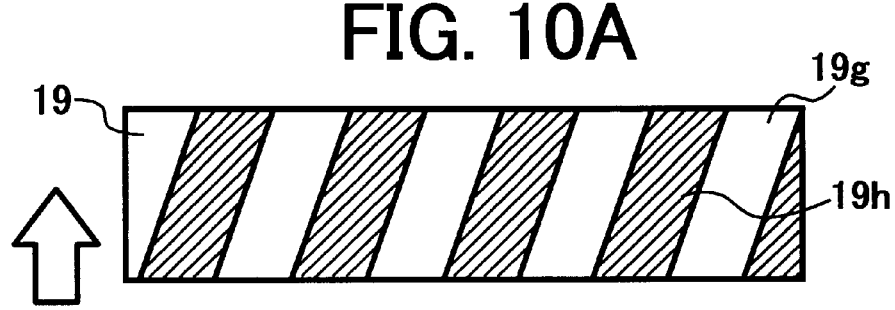
FIGS. 10A–10D are illustrations for showing several patterns of the projections and depressions shown in FIGS. 9A–9D.
Figure 10B:
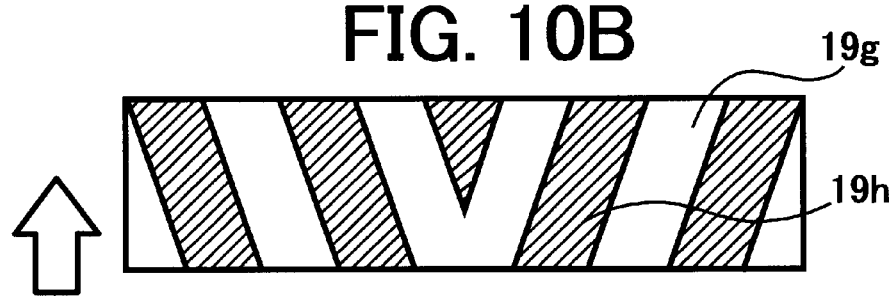
Figure 10C:
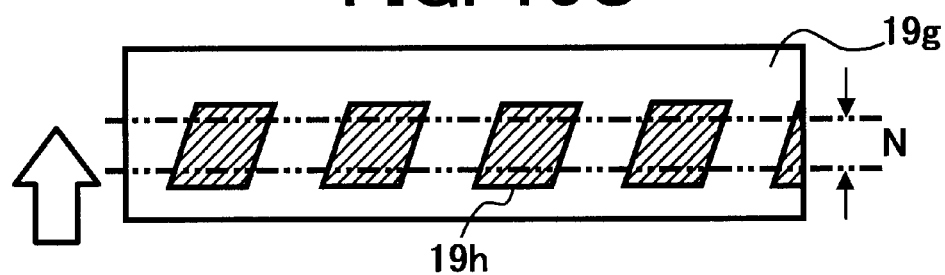
Figure 10D:
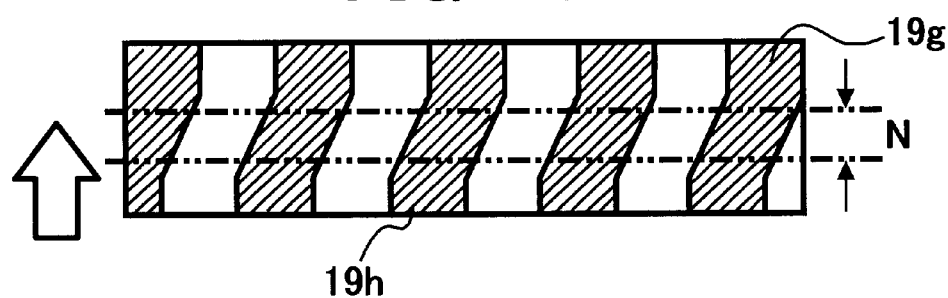

Patterns of the projections and depressions provided to the pressing member 19 are shown in FIGS. 10A–10D. These patterns run with a slight angle relative to the sheet transportation direction. For example, the pattern of FIG. 10A has parallel lines and the pattern of FIG. 10B has a V-like shape. The pattern of FIG. 10C is concentrated around the nip area. This is because the resistance force Q shown in FIG. 8 is mainly generated around the nip area. It will therefore be effective to form the patterns of the projections and depressions around an area corresponding to the nip area. The pattern of FIG. 10D generates a similar effect as is the case with FIG. 10C since the portions of the pattern are slanted around the nip area. In the pattern of FIG. 10D, the projections and depressions are extended to both edges in the sheet transportation direction. In FIGS. 10C and 10D, a letter N represents the width of the nip area.

With the above patterns of the projections and depressions, the contact area between the pressing member 19 and the recording sheet is reduced and consequently the surface tension is reduced to prevent paper jams. Further, by providing the pattern slanting relative to the sheet transportation direction, the nip pressure is kept from becoming uneven due to the projections and depressions and, consequently, a failure of the fixing process due to the projections and depressions is prevented.

Alternative to the projections and depressions, the surface tension generated between the pressing member 19 and the toner may be reduced by the slits 19a or the notches 19b of FIGS. 5A–5F. In particular, as shown in FIGS. 5C–5F, by providing the pattern slanting relative to the sheet transportation direction, the nip pressure is kept from becoming uneven due to the provisions of the slits 19a and the notches 19b.

In the fixing unit 8 having the sheet-shaped pressing member 19, it is possible that static electricity is generated by the friction between the recording sheet and the pressing member 19, in particular when the pressing member 19 is of high electrical resistance, and causes the toner particles in suspension inside the facsimile apparatus 1 to be freely attached to the recording sheet. This problem is referred to as an offset. Further, the static electricity may adversely affect the release of the recording sheet from the pressing member 19 and may eventually cause a paper jam. To prevent the generation of static electricity on the pressing member 19, a discharging brush or a grounding wire may be added or the pressing member 19 itself may be made to be of low electrical resistance, for example.

Figure 11:
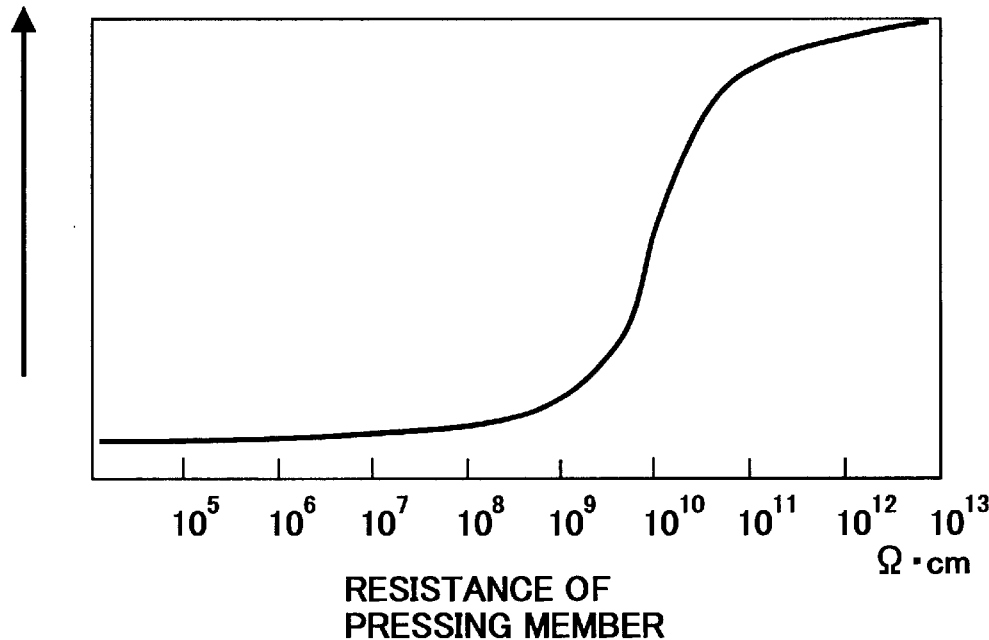
FIG. 11 is a graph for explaining a relationship between a resistance value of the pressing member and an occurrence of an offset problem.

FIG. 11 shows experimental results summarized in a graph demonstrating that the sheet-shaped pressing member 19 having an electrical resistance of approximately $10^{10}$ $\Omega$m or less can prevent the offset problem. In this experiment, the fixing roller had a diameter of 20 mm and rotated at a linear velocity of 36 mm/s, and the sheet-shaped pressing member was made of PTFE and had a thickness of 0.4 mm.

There are at least two ways to make the pressing member 19 of low resistance. One way is to make the pressing member from metal. Another way is to add conductive particles to a heat-resistant resin.

Table 1 below summarizes experimental results as a relationship between an amount of addition of conductive particles and a volume resistance, wherein the sheet-shaped pressing member was made of PFA and the added conductive particles were of conductive carbon.

TABLE 1

| Carbon Amount (% ir, weight) | Volume Resistance (Ωcm) | Dynamic Friction Resistance |
|---|---|---|
| 0 | $1.0 \times 10^{18}$ or greater | 0.15 |
| 1.2 | $2.3 \times 10^{17}$ | 0.16 |
| 2.4 | $1.1 \times 10^{11}$ | 0.18 |
| 2.9 | $1.1 \times 10^{10}$ | 0.19 |
| 6.4 | $3.0 \times 10^{7}$ | 0.21 |

As shown in Table 1, according to the experiments, it was proved that the volume resistance (Ωcm) was reduced by adding more carbon and an amount of toner attaching to the pressing member was consequently reduced. However, the friction resistance of the pressing member was increased by adding carbon, resulting in a transportation failure. Therefore, when the pressing member 19 was made of PFA and conductive carbon was added as the conductive particles, it was preferable to add the carbon in the range of a weight ratio from 1.2% to 6.4% relative to the total weight, and more preferably from 2.9% to 6.4% so that the transportation was properly performed while the undesirable toner deposition was reduced.

By the recent trend towards downsizing of machines, it possibly happens in the facsimile apparatus 1 that the trailing edge of the recording sheet remains with the transfer roller 7 when the leading edge thereof reaches the fixing roller 12. When the recording sheet is subjected to a high temperature and a high humidity under this condition, the resistance of the recording sheet is reduced and consequently the transfer charges charged on the recording sheet become movable. If the pressing member 19 is grounded, the transfer charges can be leaked through the pressing member 19, resulting sheet transportation failure. A pressing member having high electrical resistance would prevent such a transportation failure but it may cause the offset problem or a paper jam, as described above.

The above-described failure of sheet transportation can be prevented by a structure in which the sheet-shaped pressing member 19 itself has low electrical resistance, so as not to be charged, and is electrically isolated. That is, in this structure, there is no conductive member that conducts to the pressing member 19, no grounded components close to the pressing member 19, and no possible closed-circuit around the pressing member 19.

Next, an exemplary structure for supporting the sheet-shaped pressing member 19 is explained. In the structure of FIG. 4b, the pressing member 19 is fixed on the plane surface 20a in the pressing-member-mounting portion 20 with a double-sided adhesive tape or an adhesive agent. When a double-sided adhesive tape is used, the height of the plane surface 20a is needed to be adjusted due to the thickness of the double-sided adhesive tape so that the surface of the fixed side of the pressing member 19 is not projected above the surface of the sheet transportation passage. When an adhesive agent is used, it is preferable to provide a groove to the plane surface 20a to receive an excess amount of the adhesive agent so that the adhesive agent is not leaked outside from the pressing member 19. Thus, the sheet-shaped pressing member 19 can easily be fixed to the plane surface of the base 16.

Figure 12:
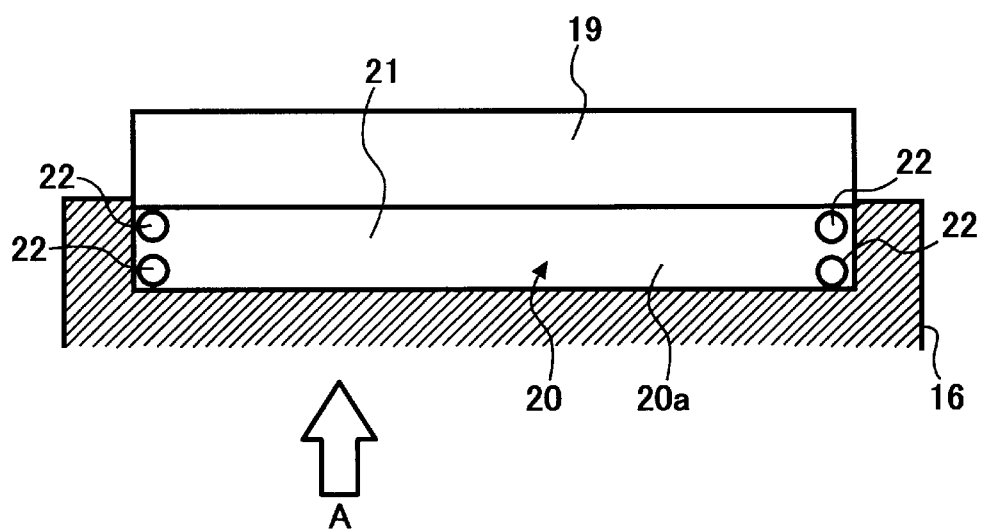
FIGS. 12, 13, 14A and 14B are illustrations for explaining several exemplary ways for fixing the pressing member.

FIG. 12 shows another exemplary structure for supporting the sheet-shaped pressing member 19. In FIG. 12, reference numeral 21 denotes a plane plate and reference numeral 22 denotes screws. The sheet transportation direction is indicated by an arrow A. In this structure, the pressing member 19 has a longitudinal length longer than the width of the maximum allowable recording sheet. The fixing side of the pressing member 19 is placed on the plane surface 20a in the pressing-member-mounting portion 20. The plane plate 21 is placed on the pressing member 19 and is fixed with the screws 22 at the regions outside the sheet transportation passage. Thereby, the pressing member 19 as well as the plane plate 21 is fixed. The height of the step in the pressing-member-mounting portion 20 is defined as equal to or greater than the total height of pressing member 19 and the plane plate 21.

With the structure of FIG. 12, the pressing member 19 can be an exchangeable component. Also, since the pressing member 19 is evenly pressed against the plane surface 20a in the pressing-member-mounting portion 20 by the plane plate 21, the pressing member 19 is fixed by a close contact to the plane surface 20a. This facilitates replacement of the pressing member 19 when it becomes defective or in a recycling process.

Figure 13:
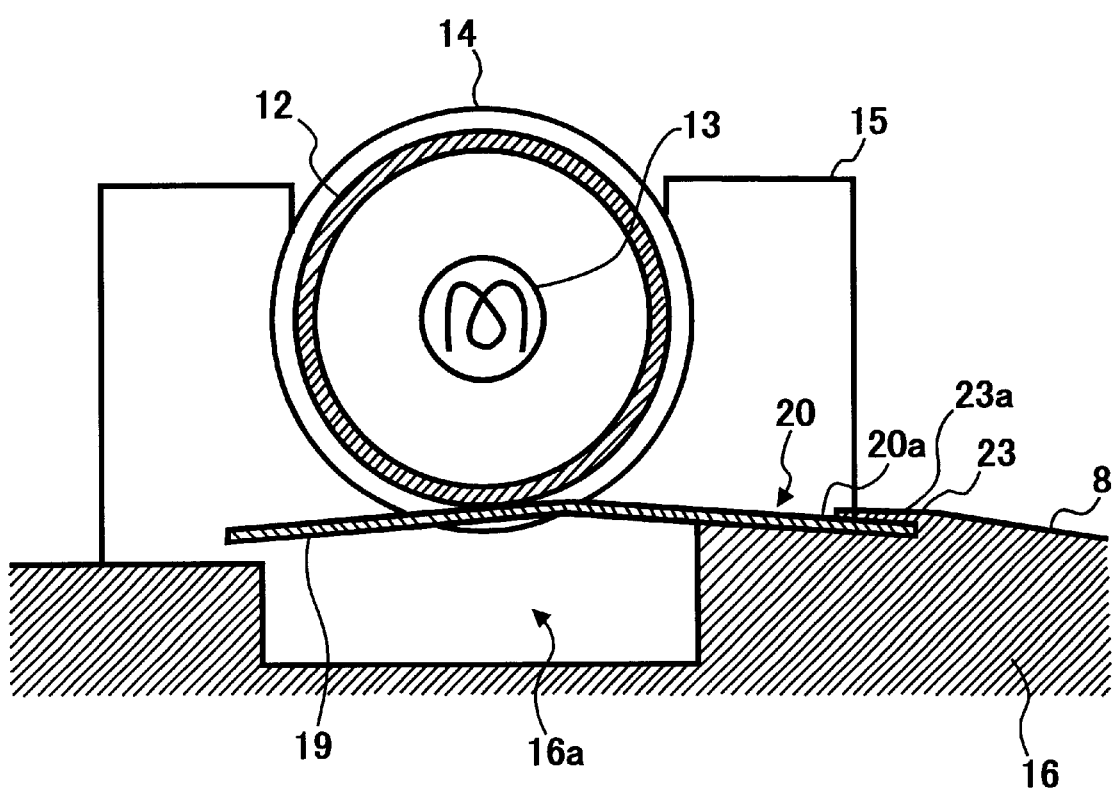

FIG. 13 shows another exemplary structure for supporting the sheet-shaped pressing member 19. In FIG. 13, reference numeral 23 denotes a holding portion for holding the fixing side of the pressing member 19. The holding portion 23 is formed in a laying-U-like shape and has an opening into which the fixing side of the pressing member 19 is inserted. For this, the opening has a height approximately equal to the thickness of the pressing member 19. Thereby, the pressing member 19 is fixed. Moreover, an extension side 23a of the holding portion 23 is configured to press the pressing member 19 against the plane surface 20a so that the pressing member is fixed by a close contact to the plane surface 20a. With this structure, it is possible to exchange the pressing member 19 without the needs of any special way for fixing the pressing member 19.

Figure 14A:
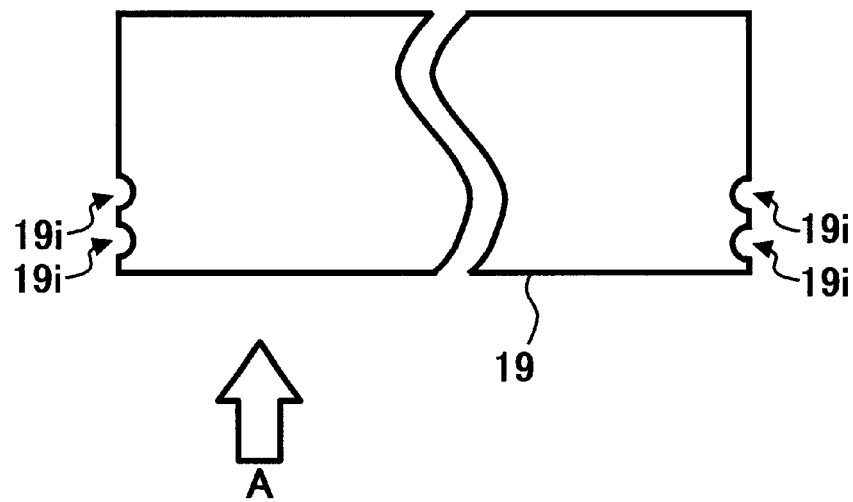
Figure 14B:
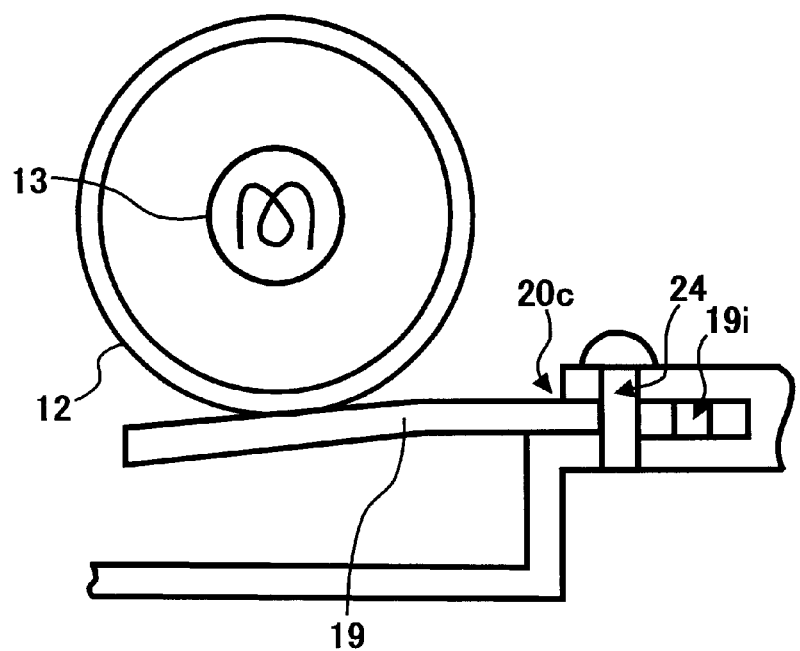

Referring to FIGS. 14A and 14B, another exemplary structure for supporting the sheet-shaped pressing member 19 is explained. FIG. 14A is a top view of the pressing member 19 and FIG. 14B is a cross-sectional view of the fixing unit 8, wherein reference numeral 19i denotes a notch, reference numeral 20c denotes a hollow, and reference numeral 24 denotes a screw hole. The sheet transportation direction is indicated by an arrow A.

As shown in FIG. 14A, a plurality of notches 19i are provided to each edge of the fixing side of the pressing member 19. The hollow 20c is provided to the pressing-member-mounting portion 20, as shown in FIG. 14B. The fixing side of the pressing member 19 is inserted into the hollow 20c and is fixed to the pressing-member-mounting portion 20 with the screws 24 using the notches 19i.

In an event that the pressing member 19 is worn at the nip area and the nip pressure is reduced or that the surface coating layer is worn out, the screws 24 are loosened and are fixed using other notches 19i so that another portion of the surface of the pressing member 19 becomes the nip area.

With the structure of FIGS. 14A and 14B, the nip area can be changed and therefore the pressing member 19 has a longer life. The number of notches 19i may be made as high as possible depending upon accessibility to the fixing unit 8 in the facsimile apparatus 1. Further, the pressing member 19 may be fixed in place with latches to be engaged in the notches 19i, in place of the screws 24.

Figure 15:
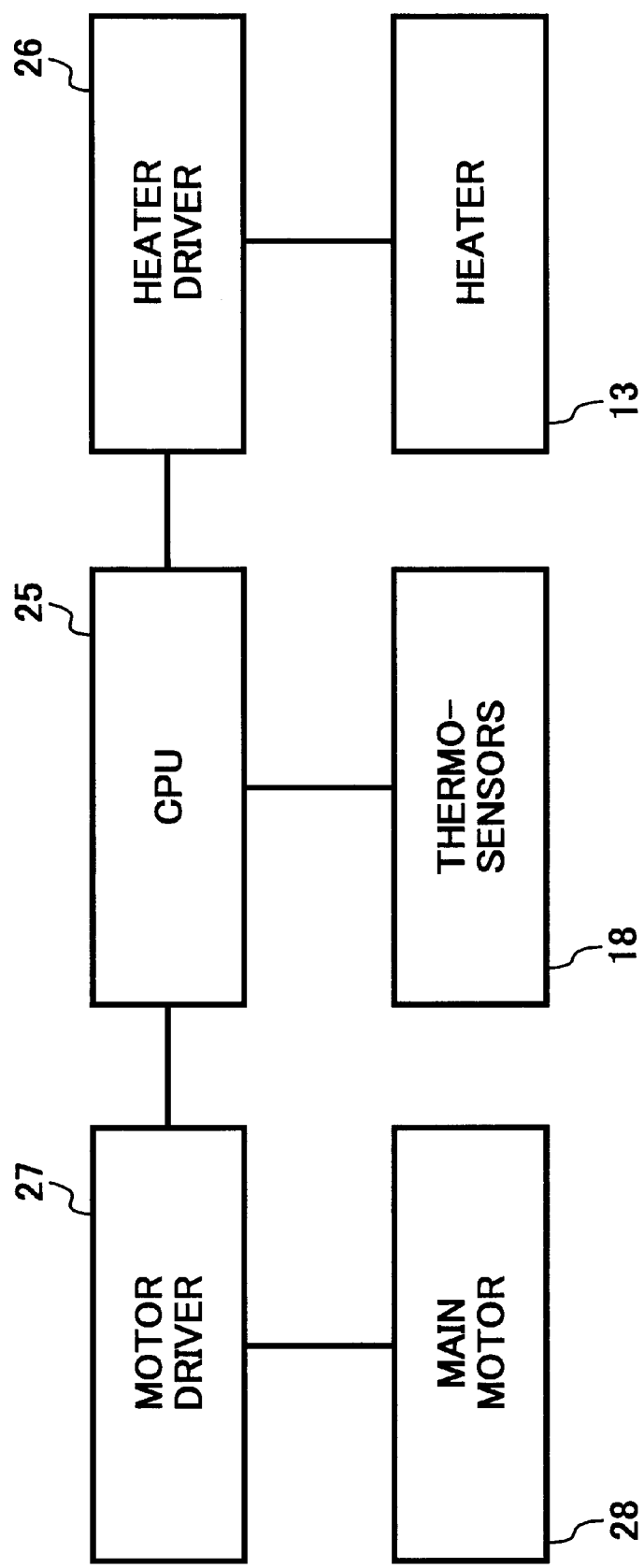
FIG. 15 is a schematic block diagram for explaining a control system of the facsimile apparatus of FIG. 2.

Next, an exemplary configuration of a controlling system used in the facsimile apparatus 1 is explained with reference to FIG. 15. FIG. 15 is a block diagram of the controlling system that includes a CPU (central processing unit) 25 controlling the entire operations of the facsimile apparatus 1 using the thermo-sensors 18, a heater driver 26 driving the heat 13 under the control of the CPU 25, and a motor driver 27 driving a main motor 28 under the control of the CPU 25.

When power is provided to the facsimile apparatus 1, the CPU 25 first enters an initialization process and drives the heater 13 to heat up the fixing roller 12. The CPU 25, at this time, calculates a rising temperature based on the temperature detected by the thermo-sensors 18. When the gradient of the calculated rising temperature is greater than a predetermined value, the CPU 25 determines that the pressing member 19 is worn out at the nip area and is needed to be replaced. The CPU 25 indicates such determination to the user through an indication panel or the like.

Figure 16:
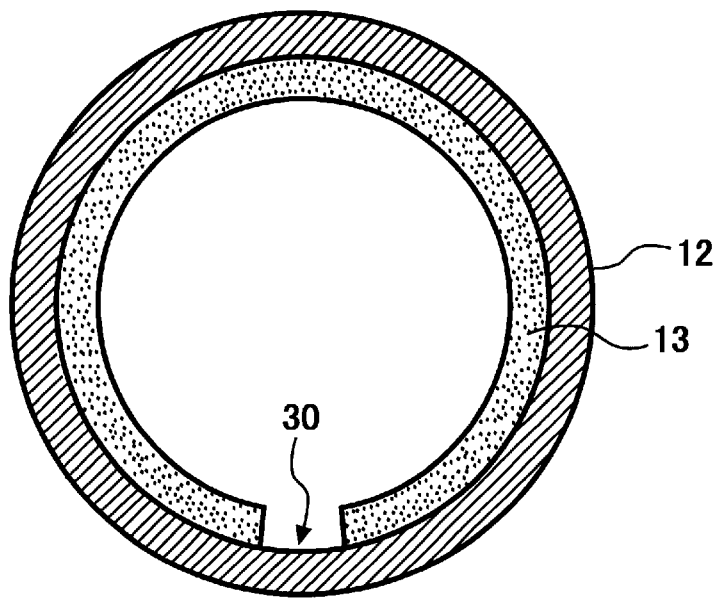
FIGS. 16–19 are illustrations for explaining a heater contained inside the fixing roller of FIG. 3.

FIG. 16 is a cross-sectional view of the fixing roller 12 provided with the heater 13 that includes a flexible sheet member in which a heating member is imbedded. The heater 13 is fixed to the inside surface of the fixing roller 12 such that it forms a non-heated portion 30 at a position both edges meet in the longitudinal direction of the fixing roller 12 since the heating member is not present in the both edges.

The fixing unit 8 is provided with an encoder (not shown) for indicating the position of the non-heated portion 30. Based on the information from the encoder, the CPU 25 controls the non-heated portion 30 to contact the pressing member 19 when the fixing roller 12 is stopped.

Figure 17:
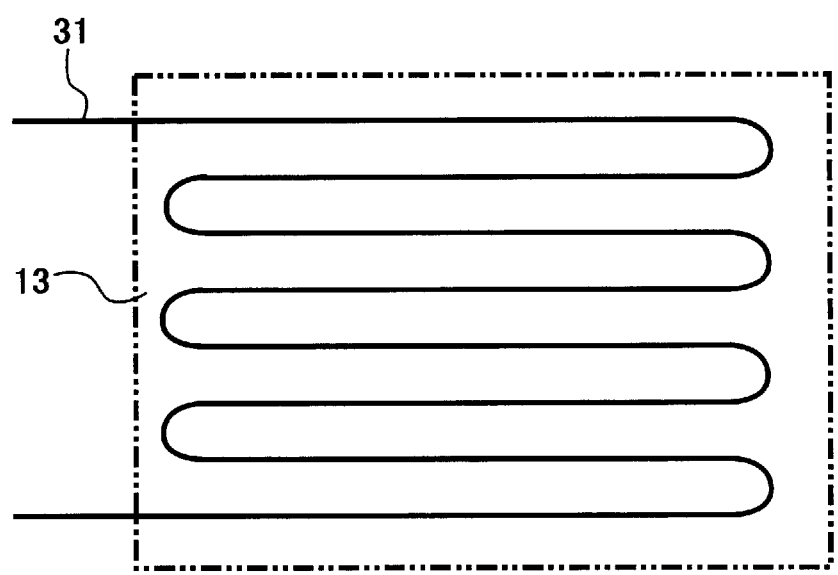
Figure 18:
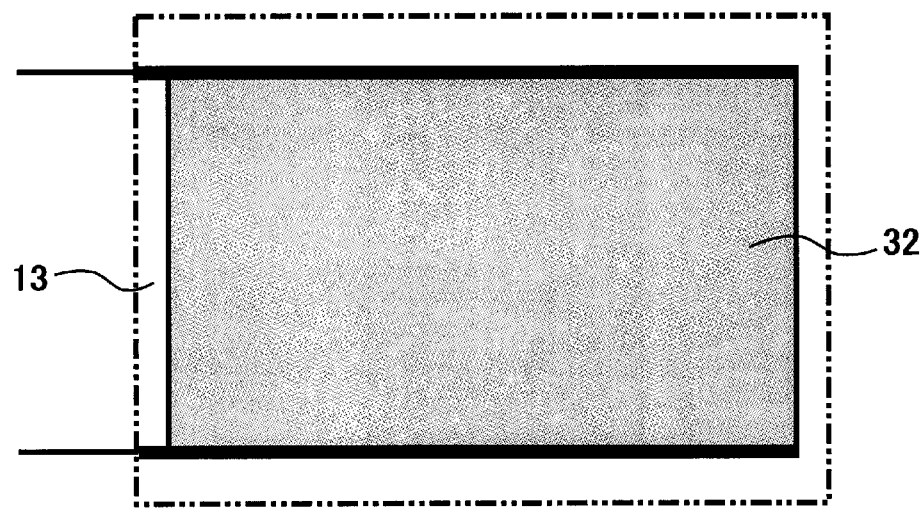

FIG. 17 shows an example of the heating member 13 of FIG. 16. The heating member 13 of FIG. 17 includes a flexible heating line 31 which is formed in a shape, as shown in FIG. 17. FIG. 18 shows another example of the heating member 13 which includes a heating plane 32. The fixing roller 12 is effectively heated up because it is directly heated up by the heating member 13 including the heating plane 32. In addition, since the fixing roller 12 heated up while being held in contact with the pressing member, the temperature of the fixing roller 12 is quickly increased.

Figure 19:
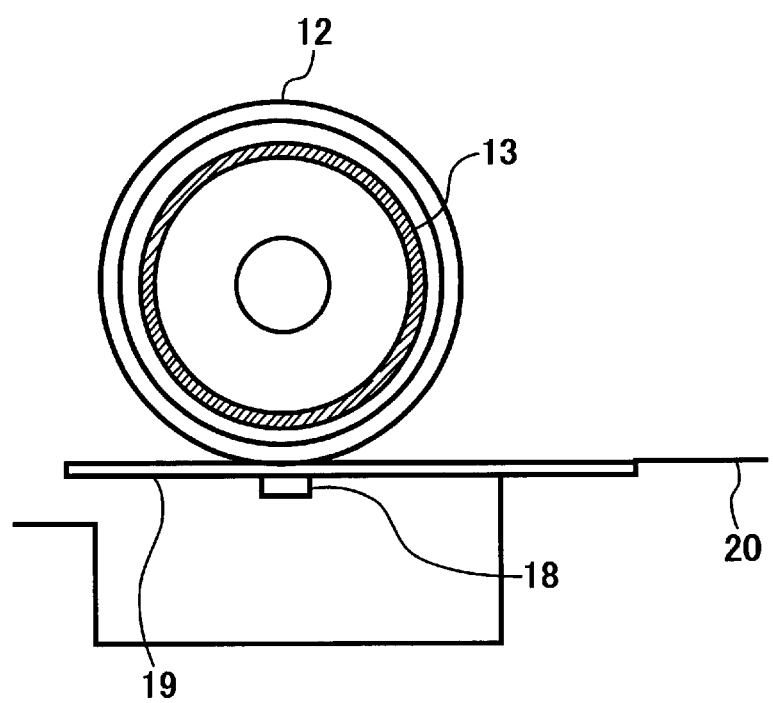

FIG. 19 shows another example of the heating member 13 using a dielectric heating method. In this case, the temperature of the fixing roller 12 is quickly raised. In addition, by making the fixing roller 12 held in contact with the pressing member 19 made of metal, the pressing member 19 is quickly heated up and the nip area of the pressing member 19 can be made ready in a relatively short time period. As an alternative, a halogen heater including argon may be used as the heating member 13. By the inclusion of argon, heat efficiency is increased and quick heating is made possible.

Figure 20:
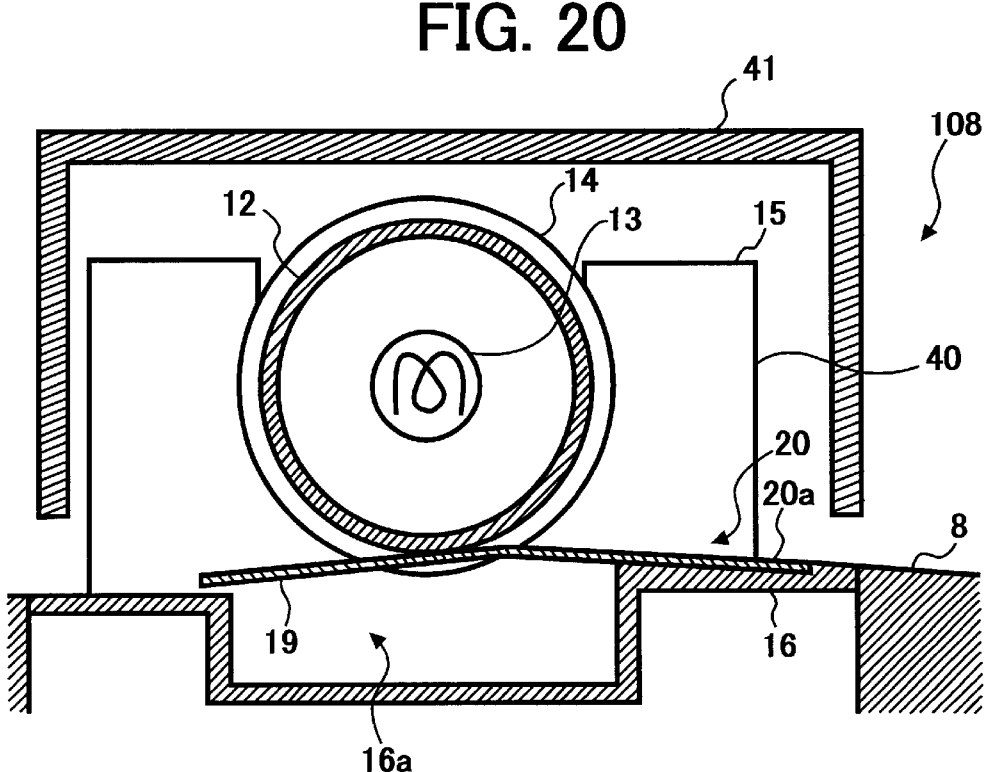
FIGS. 20 and 21 are illustrations for explaining another fixing apparatus.
Figure 21:
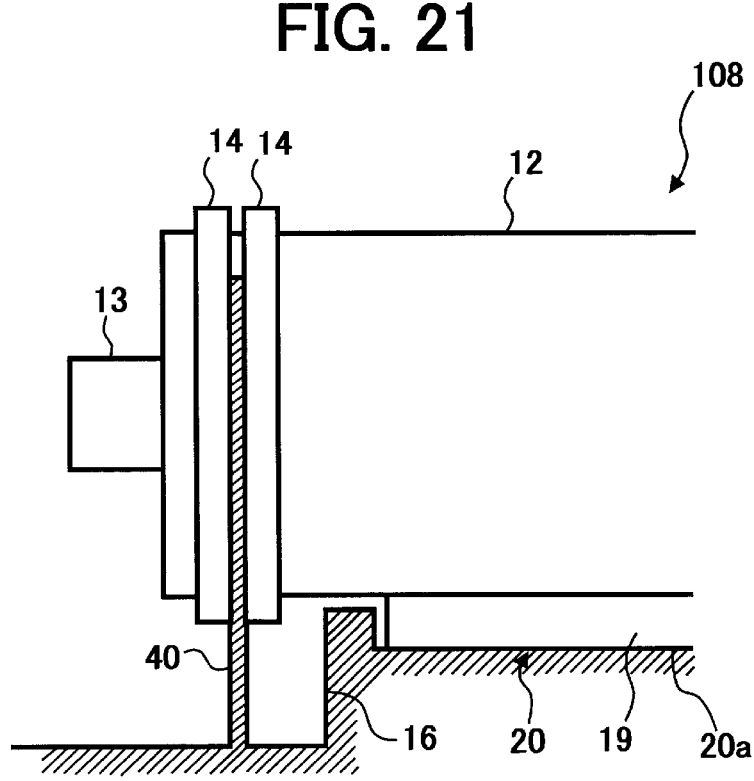

FIG. 20 shows a fixing unit 108 according to another preferred embodiment. In FIG. 20, reference numeral 40 denotes a fixing portion and reference numeral 41 denotes an external case. FIG. 21 is a front view in part of the fixing unit 108. Since the fixing unit 108 is made on the basis of the fixing unit 8 of FIG. 2 and is therefore similar to it, except for the fixing portion 40 and the external case 41. In FIGS. 20 and 21, the components identical to or having functions similar to those of the fixing unit 8 of FIG. 2 are labeled with the same reference numeral and are not repetitively described.

The fixing unit 108 is provided with the fixing portion 40, in place of the bracket 15 shown in FIG. 4A, and which is unified with the base 16, as well as with the pressing-member-mounting portion 20. The fixing unit 108 is detachably mounted in the facsimile apparatus 1.

This structure facilitates assembling of the fixing unit 108, eliminating the process of fixing the bracket 15. In the case of the fixing unit 8 of FIG. 2, it is also possible that the bracket 15 made of heat resistant resin is molded together with the base 16. Accordingly, the base 16 is of the same material. In the fixing unit 8, the base 16 is a relatively large component as it includes the lower guide for guiding the recording sheet from the transfer roller 7 to the fixing unit 8. Therefore, this increases the amount of the heat-resistant resin which will increase the whole manufacturing cost of the facsimile apparatus 1. In comparison with such fixing unit 8, the detachably mountable fixing unit 108 allows the base 16 to be formed in a relatively small size and therefore it facilitates an integration of the base 16 and the fixing portion 40 into a single-piece molded base.

Figure 22:
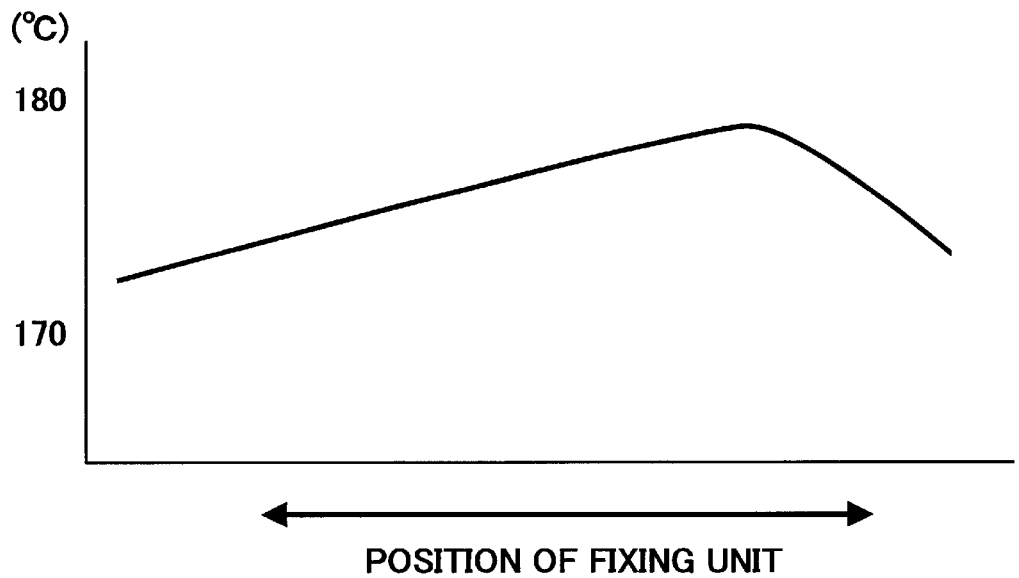
FIGS. 22 and 23 are illustrations for explaining further another fixing apparatus.

In general, an image forming apparatus such as the facsimile apparatus 1 is provided with a cooling mechanism for generating an air flow to exchange the heated internal air with outside air so that the temperature inside the apparatus is reduced. However, the fixing unit is adversely affected with such a cooling mechanism. That is, this air flow passes by the fixing unit and, as a result, it causes a difference between the temperatures at the air inlet side and the air outlet side of the fixing roller 12. For example, FIG. 22 shows a case in which the air flows from one end to the other end of the fixing roller 12. This difference will be a cause of a problem in that the fixing process is unevenly performed. This problem is referred to as an uneven fixing problem.

Figure 23:
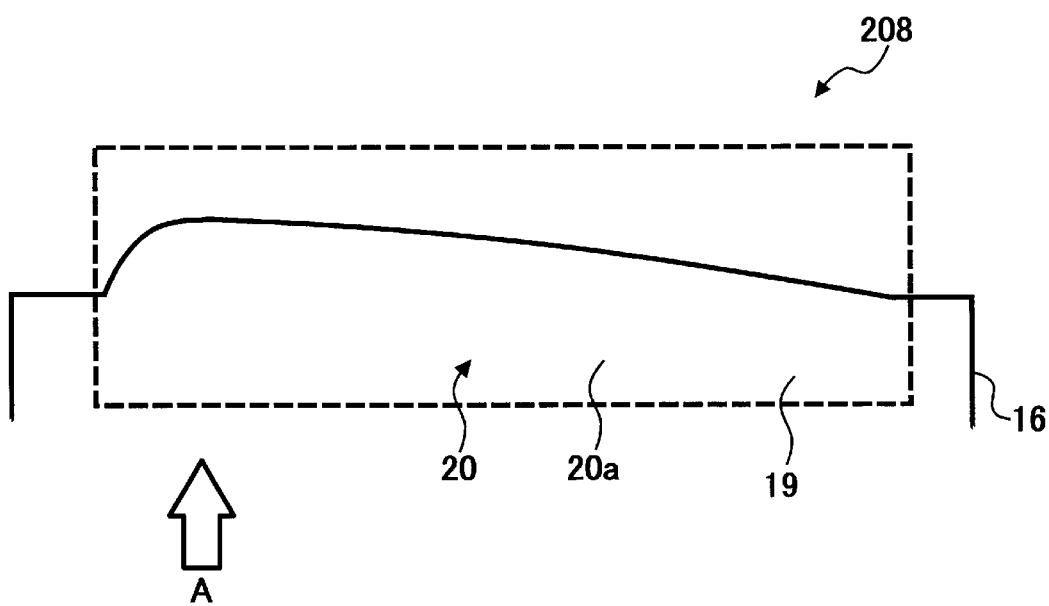

FIG. 23 shows a main portion of a fixing unit 208 that is configured to avoid the above-described uneven fixing problem. The fixing unit 208 is made on the basis of the fixing unit 8 of FIG. 2. In FIG. 23, the components identical to or having functions similar to those of the fixing unit 8 of FIG. 2 are labeled with the same reference numeral and are not repetitively described. In FIG. 23, an arrow A indicates the sheet transportation direction.

In the fixing unit 208 of FIG. 23, one side of the pressing-member-mounting portion 20 corresponding to the low temperature region in the graph of FIG. 22 is projected towards the nip area and the other side of the pressing-member-mounting portion 20 corresponding to the high temperature region is moved away from the nip area, as shown in FIG. 23. With this structure, a flexible portion of the pressing member 19 corresponding to the high temperature region in the graph of FIG. 22 is relatively longer in the sheet transportation direction so that the nip area becomes narrower. On the contrary, a flexible portion of the pressing member 19 corresponding to the low temperature region in the graph of FIG. 22 is relatively shorter in the sheet transportation direction so that the nip area becomes wider. As a result, the fixing unit 208 can fix the toner image onto the recording sheet without causing the uneven fixing problem.

Figure 24:
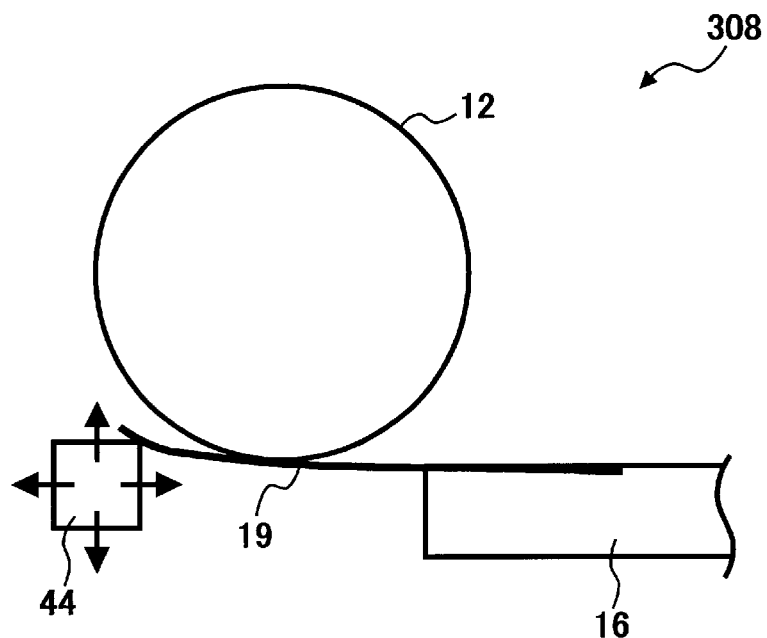
FIGS. 24 and 25 are illustrations for explaining further another fixing apparatus.

FIG. 24 shows a main portion of a fixing unit 308 according another embodiment. The fixing unit 308 is made on the basis of the fixing unit 8 of FIG. 2 and is therefore similar to the fixing unit 8, except for a stopper 44. In FIG. 24, the components identical to or having functions similar to those of the fixing unit 8 of FIG. 2 are labeled with the same reference numeral and are not repetitively described.

In order to have the fixing unit ready for the fixing process, it is generally desirable to make the sheet-shaped pressing member as thin as possible. However, as the pressing member becomes thin, it increases flexibility so that, for example, when a thicker recording sheet is used the pressing member is pressed down and the nip area is easily changed. In this case, the fixing unit cannot maintain a stable nip pressure.

In the fixing unit 308, the length of the pressing member 19 is adjusted so that the free side thereof downstream from the nip area in the sheet transportation passage contacts the stopper 44. Thereby, the free side of the pressing member 19 is regulated by the stopper 44 in moving in the vertical direction. The mounting position of the stopper 44 is movable so as to change the stopping position of the free side of the pressing member 19.

With the above-described structure, since the free side of the pressing member 19 merely contacts the stopper 44, when the recording sheet is transported, the pressing member 19 is moved towards the stopper 44 by a slight distance, while maintaining the appropriate nip pressure, so as to form a clearance between the fixing roller 12 and the pressing member 19 through which the recording sheet can be transported. At the same time, the appropriate nip width can also be maintained because of the flexible deformation of the pressing member 19.

Figure 25:
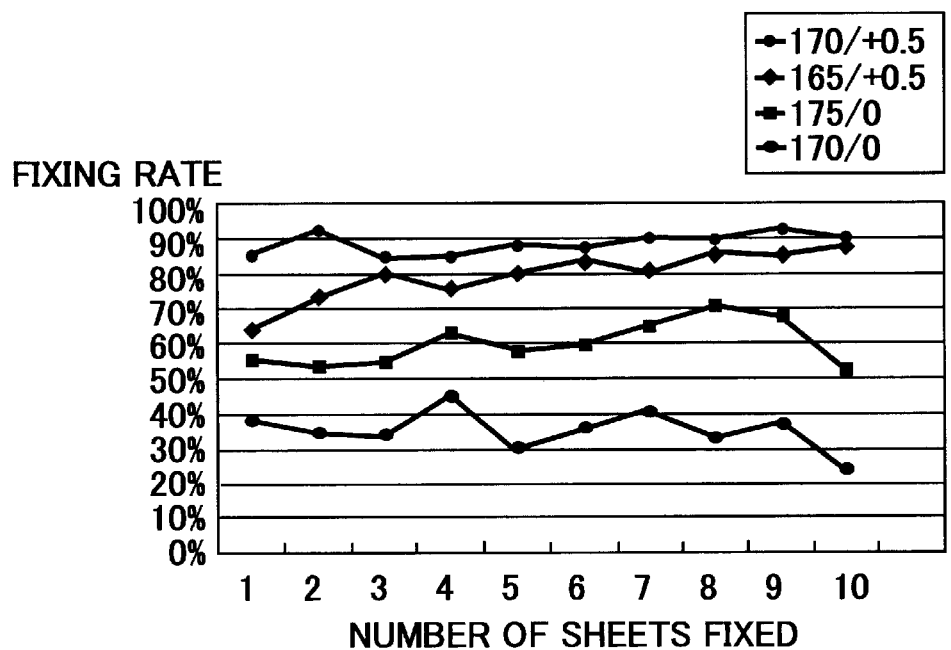

FIG. 25 demonstrates experimental results summarized in a relationship between a success ratio of the fixing process and the number of recording sheets transported under different conditions of the stopper 44. The experiments were performed under the following conditions.

1. Test machine: a sheet press fixing test machine (a linear velocity of 37 mm/s).
2. Toner: jx693 (tfb=113° C., a standard value 111±5° C.).
3. Environment: normal temperature and humidity (at a laboratory environment).
4. Recording sheet: type T6200, size A4 (manufactured by Ricoh CO., Ltd.).
5. Sheet transportation conditions: transportation of successive 10 sheets in an energy saving standby mode.
6. Material of pressing member: PTFE.
7. Thickness of pressing member: 0.3 mm.
8. Measuring apparatus: an automatic fixing ratio measuring apparatus.

In the graph of FIG. 25, an expression of 170/+0.5, for example, represents the conditions in that the fixing temperature was 170° and the stopper 44 was used so that the free side of the pressing member 19 was lifted by 0.5 mm. By comparing the cases of 170/+0.5 and 170/0, for example, in the graph of FIG. 25, it can be concluded that an average fixing ratio was increased from approximately 35% to approximately 90% by using the stopper 44. From the graph of FIG. 25, it is also concluded that the fixing ratio can be improved better by using the stopper 44 than increasing the fixing temperature.

With this structure, the fixing unit 308 can properly maintain the nip pressure and allows an adjustment of the nip width.

Figure 26:
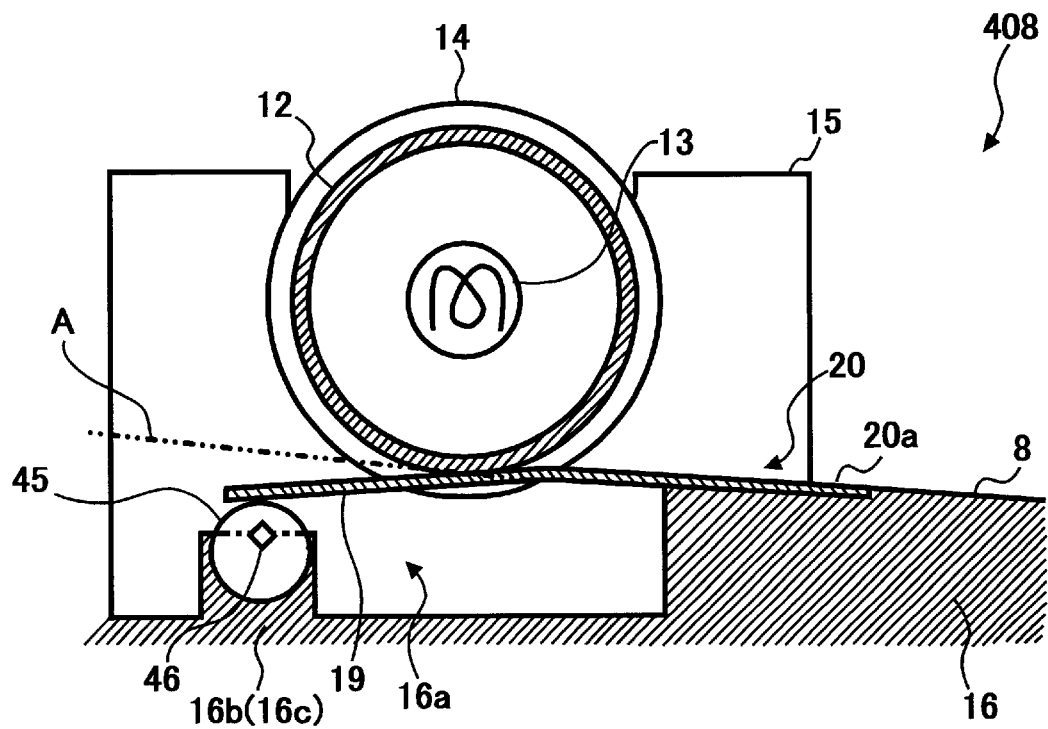
FIGS. 26–28 are illustrations for explaining further another fixing apparatus.

FIG. 26 shows a structure of a fixing unit 408 according another embodiment. The fixing unit 408 is made on the basis of the fixing unit 8 of FIG. 2 and is therefore similar to the fixing unit 8, except for a stopper roller 45 having an eccentric rotation shaft 46. In FIG. 26, the components identical to or having functions similar to those of the fixing unit 8 of FIG. 2 are labeled with the same reference numeral and are not repetitively described.

The eccentric rotation shaft 46 is a square cross-section bar and is arranged such that one of diagonal lines of the square in cross-section passes through the center point of the stopper roller 45. The base 16 is provided with shaft holders 16b and 16c at both sides and the end of the hollow 16a downstream from the nip area, as shown in FIG. 26. The shaft holders 16b and 16c have a V-like-shaped cut so that the eccentric rotation shaft 46 is placed with its ends in the right-angled V-like-shaped cut.

The free side of the sheet-shaped pressing member 19 contacts the stopper roller 45 when the stopper roller 45 is held by the shaft holders 16b and 16c.

Figure 27:
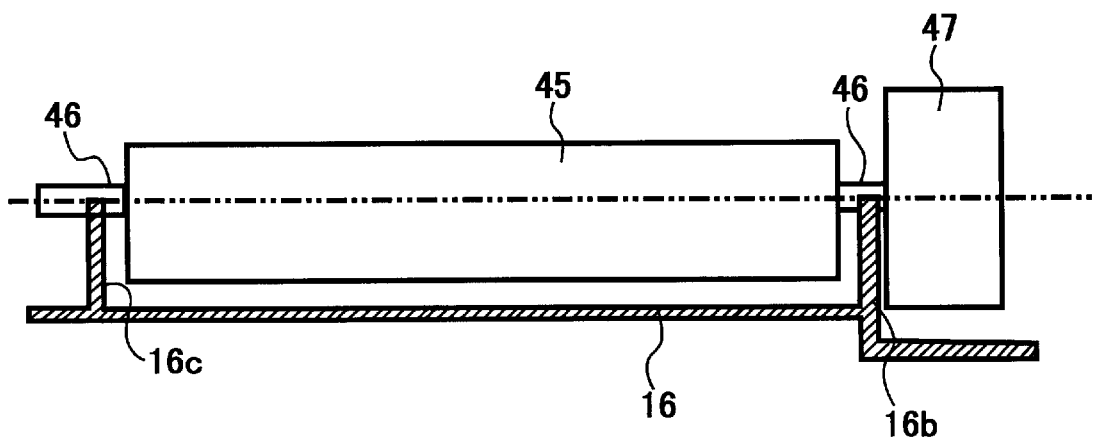

As shown in FIG. 27, a dial 47 is mounted to the eccentric rotation shaft 46 at its one end and is rotated about the eccentric rotation shaft 46 by the user.

Figure 28:
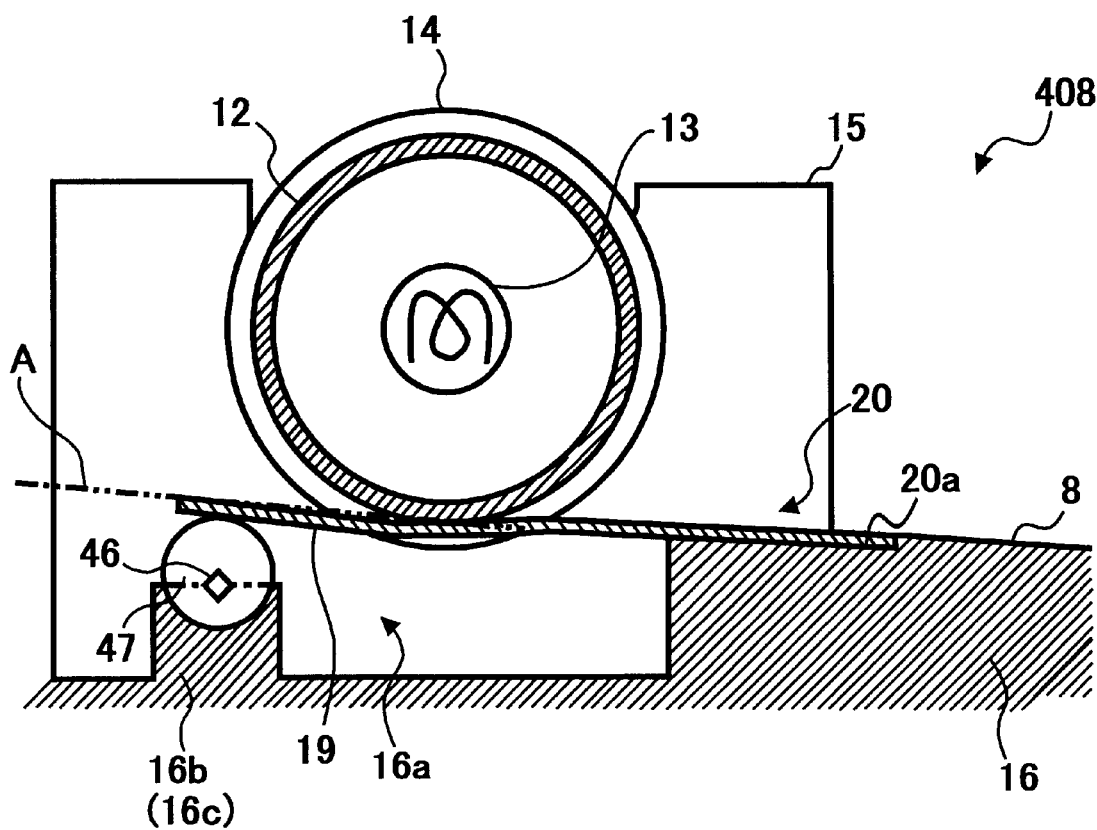

When the eccentric rotation shaft 46 is held with the corner of the square in cross-section closest to the center of the stopper roller 45 by the shaft holders 16b and 16c, the free side of the pressing member 10 is brought to the closest position to the eccentric rotation shaft 46 while contacting the stopper roller 45, as shown in FIG. 26. When the dial 47 is turned by 90 degrees, the eccentric rotation shaft 46 is held with the next corner of the square in cross-section by the shaft holders 16b and 16c. Consequently, the free side of the pressing member 10 is lifted up while maintaining the contact with the stopper roller 45. As a result, the pressing member 19 contacts the fixing roller 12 over a wider area so that the nip area is extended. Then, by further turning the dial 47 by 90 degrees, the eccentric rotation shaft 46 is held with the corner of the square in cross-section farthest from the center of the stopper roller 45 by the shaft holders 16b and 16c. Consequently, the free side of the pressing member 10 is brought to the farthest position from the eccentric rotation shaft 46 while maintaining the contact with the stopper roller 45, as shown in FIG. 28. As a result, the maximum nip area is formed between the fixing roller 12 and the pressing member 19. As such, the dial 47 is capable of changing width of the nip area.

On the dial 47, there are provided indication of recording sheet types and other conditions in association with the corners of the square in cross-section of the eccentric rotation shaft 46. In the example of FIG. 26, the dial 47 is provided with the indication of "a thick sheet," "a regular sheet," and "a thin sheet." When a thick recording sheet is used, for example, the user turns the dial 47 to set the pressing member 19 to the lowest position. When a thin recording sheet is used, for example, the user turns the dial 47 to set the pressing member 19 to the highest position. Further, when a regular recording sheet is used, the user turns the dial 47 to set the pressing member 19 to a middle position.

In this way, with the structure of FIG. 26, the pressing member 19 contacts the stopper roller 45 with the back surface of the free side thereof and the stopper roller 45 regulates a movement of the pressing member 19. Therefore, the nip area can properly be maintained. The nip area can be adjusted according to the types of the recording sheet and/or the conditions by turning the dial 47 connected to the eccentric rotation shaft 46. Since the holders 16b and 16c have the right-angled V-like-shaped cuts, the user can feel tactile feedback from the holders and the eccentric rotation shaft 46 when they are engaged.

Adjusting the nip area may be performed with an electrical control in place of the user's manual operation using the dial 47 to change the vertical position of the pressing member 19.

Figure 29A:
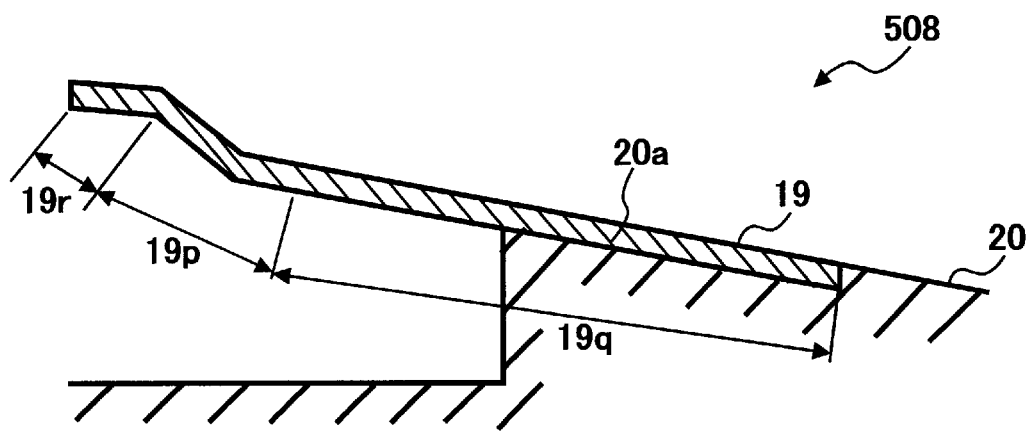
FIGS. 29A and 29B are illustrations for explaining further another fixing apparatus.

In general, the pressing member 19 may have different properties between the cases when it is made of resin and of metal. Resin generally has a thermal expansion greater than that of metal and therefore the pressing member 19 made of resin may have different expansion in the free side and the fixed side to the pressing-member-mounting portion 20. As a result, the free side may have a wavy form, as shown in FIG. 29A. This may make the nip pressure uneven. In contrast to the resin case, the metal-made pressing member 19 is hard and less flexible and therefore needs to be pressed with a higher pressure to the fixing roller 12 so as to properly form the nip area. However, a high pressure may produce wrinkles in the recording sheet. The resin-made pressing member 19 may also cause a similar failure when it has a relatively large thickness and a relatively low flexibility.

Figure 29B:
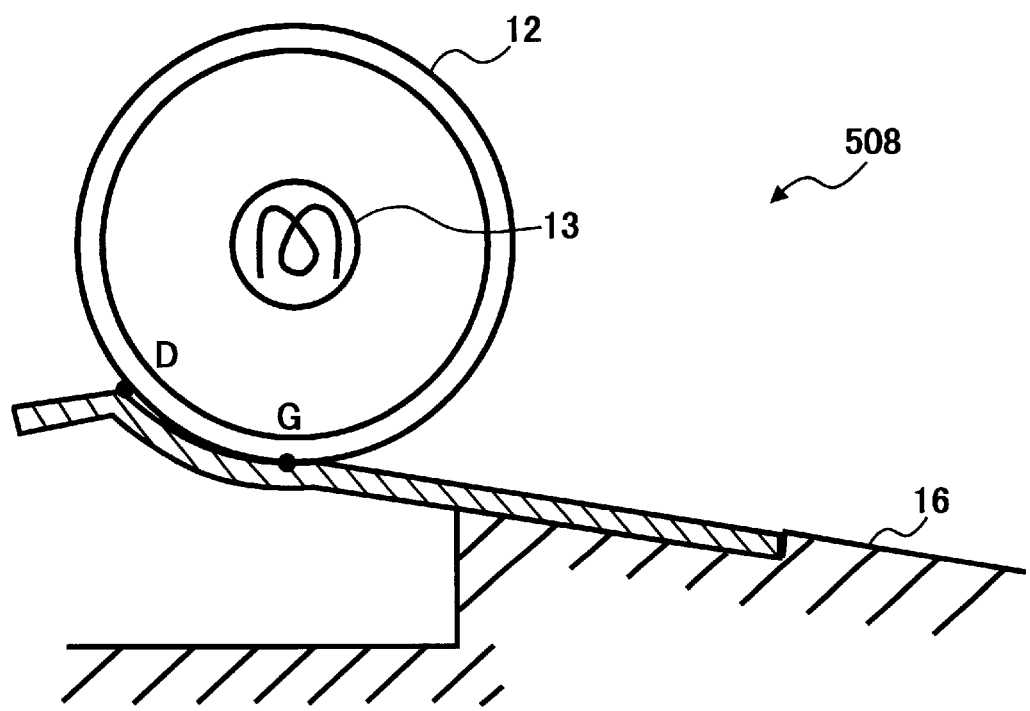

FIGS. 29A and 29B show a fixing unit 508 according to another preferred embodiment of the present invention. The fixing unit 508 is designed to solve the above problem related to the heat expansion. The fixing unit 508 is made on the basis of the fixing unit 8 of FIG. 2 and is therefore similar to the fixing unit 8, except for the shape of the pressing member 19. In FIGS. 29A and 29B, the components identical to or having functions similar to those of the fixing unit 8 of FIG. 2 are labeled with the same reference numeral and are not repetitively described.

As shown in FIG. 29A, the pressing member 19 includes a nip portion 19p, an upstream portion 19q, and a downstream portion 19r. The nip portion 19p is formed by plastic deformation in a cylindrical surface in part having the same curvature as the fixing roller 12 so as to contact the fixing roller 12. The upstream portion 19q is formed in a plane portion upstream from the nip area. The downstream portion 19r is formed in a plane portion downstream from the nip portion.

As shown in FIG. 29B, when the pressing member 19 is fixed to the pressing-member-mounting portion 20, the upstream portion 19q is slanted upwards, the nip portion 19p contacts the fixing roller 12, and the downstream portion 19r is separated away from the fixing roller 12. The surface of the plane portion 19q and the cylindrical surface of the nip portion 19p are continuous. In FIG. 29B, a point C is an edge point of the nip portion 19p in the upstream side of the sheet transportation direction and a point D is an edge point of the nip portion 19p in the downstream side. The plane of the upstream portion 19q is slanted in the direction of a tangent line at the point C. The plane of the downstream 19r is slanted in the direction of a tangent line at the point D or in a direction coming close to the normal to the surface of the fixing roller 12 at the point D.

When the pressing member 19 is provided with the slits 19a, the notches 19b, or the cuts 19c during the manufacturing process, a raw metal plate member, for example, is first subjected to a process for forming the slits 19a, for example, and then to a process for forming the cylindrical surface in the nip portion. When the pressing member is provided with a fluoride resin layer through a surface coating process, a raw metal plate member is subjected to a process for forming the slits 19a, to the surface coating process to form a fluoride resin layer, and then to the process for forming the cylindrical surface in the nip portion. When the pressing member is provided with a fluoride resin layer by an adhesion of a fluoride resin adhesive tape, a raw metal plate member is subjected to a process for forming the slits 19a, to the process for forming the cylindrical surface in the nip portion, and then to a process for adhering the fluoride resin adhesive tape. To use a fluoride resin adhesive tape, it is preferable to cover the whole surface of the free side of the pressing member by turning the edges of the tape to the backside of the pressing member.

With the above-described structure, the recording sheet forwarded by the transfer roller 7 is guided to the nip portion 19p via the upstream portion 19q and is then transported to the ejection roller 9 via the downstream portion 19r.

In this way, the fixing unit 508 can obtain a sufficient nip area with applying a relatively small pressure by including the sheet-shaped pressing member 19 formed in a cylindrical shape, having the same curvature as the fixing roller 12, in the nip area for contacting the fixing roller 12 so as to form a sufficient width of the nip area. As a result, the fixing unit 508 can avoid the generation of wrinkles in the recording sheet while maintaining a sufficient fixing performance.

Further, the fixing unit 508 allows the smooth entrance of the recording sheet into the nip area by forming the pressing member 19 such that the plane of the upstream portion is slanted in the direction of the tangent line at the point C of the nip portion. As a result, the fixing unit 508 reduces paper jams.

In addition, if the free side of the pressing member 19 ended as a part of the cylindrical shape, the leading edge of the recording sheet would be brought into collision with the free side of the pressing member 19. In particular, the metal-made pressing member may have burrs on the surface and these burrs can cause paper jams when the recording sheet touches the burrs. In order to avoid such a paper jam, the plane of the downstream portion 19r is slanted in the direction of a tangent line at the point D or in a direction coming close to the normal to the surface of the fixing roller 12 at the point D. Thereby, the above-described structure can reduce paper jams caused by the collision of the recording sheet with the free side of the pressing member 19.

The pressing member 19 is strengthened in the longitudinal direction, in particular, by being formed in the cylindrical curve. Accordingly, when the pressing member 19 is brought to contact the fixing roller 12, both edges of the pressing member 19 in the longitudinal direction are strongly pressed against the fixing roller 12 but the pressure at the center region is relatively weak. That is, the nip pressure is not even along the pressing member 19 from one side edge to the other side edge via the center. As a result, fixing failure may be caused. Therefore, in order to avoid such a fixing failure, the pressing member 19 is provided with the slits 19a, the notches 19b, or the cuts 19c so as to eliminate uneven nip pressure. Thereby, the fixing unit 508 can avoid the above-described fixing failure.

The above-described fixing unit 8 of FIG. 2 may include a mechanism for releasing the contact between the fixing roller 12 and the pressing member 19 by lifting and lowering the fixing roller 12 or turning the pressing-member-mounting portion 20, for example, so as to allow the user to remove a jammed sheet when a paper jam occurs.

In addition, the pressing-member-mounting portion 20 may be made of metal. In this case, the pressing-member-mounting portion 20 is protected from deformation when the pressing member 19 and the fixing roller 12 are heated to a relatively high temperature. Such pressing-member-mounting portion 20 dissipates heat at the same time.

Figure 30:
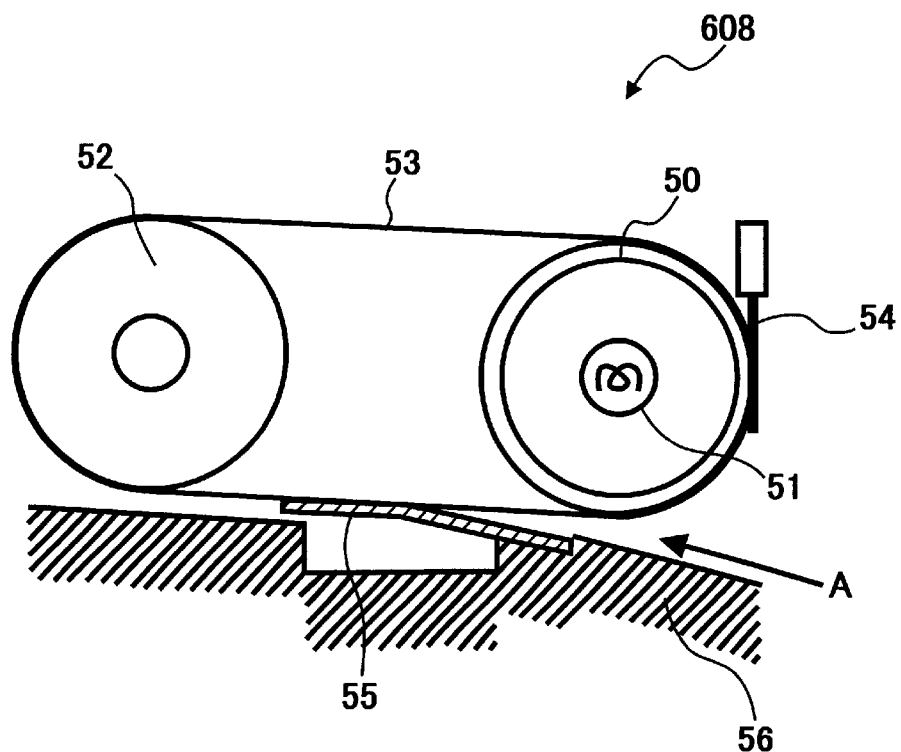
FIG. 30 is an illustration for explaining another fixing apparatus, wherein the fixing apparatus uses a fixing belt.

FIG. 30 shows a fixing unit 608 according to another preferred embodiment. As shown in FIG. 30, the fixing unit 608 includes a fixing roller 50, a heater 51, a tension roller 52, a fixing belt 53, a thermistor 54, a sheet-shaped pressing member 55, and a frame 56. The fixing belt 53 is extended under tension between the fixing roller 50 and the tension roller 52. The thermistor 54 contacts the fixing belt 53 on the fixing roller 50. The pressing member 55 is fixed to the frame 56 with its fixing side so as to contact under pressure the fixing belt 55 with the free side of the pressing member 55.

The fixing roller 50 and the tension roller 5:2 are arranged upstream and downstream, respectively, in the sheet transportation passage. The fixing belt 53 is cyclically rotated by the rotation of the fixing roller 50 and the tension roller 52. Particularly, at the lower side of the fixing belt 53, it moves from the fixing roller 50 to the tension roller 52. The pressing member 55 contacts the fixing belt 53 with the free side in an area between the fixing roller 50 and the tension roller 52 in the lower side of the fixing belt 53, excluding the areas right on both the fixing roller 50 and the tension roller 52. The free side of the pressing member 55 is downstream from the fixing side thereof.

The pressing member 55 may be made of a sheet member having no flexibility since the fixing belt 53 has flexibility.

With this structure, the recording sheet passes through the portion of contact between the fixing belt 53 and the pressing member 55 and is subjected to heat and pressure so that a toner image is fixed on the recording sheet.

Figure 31:
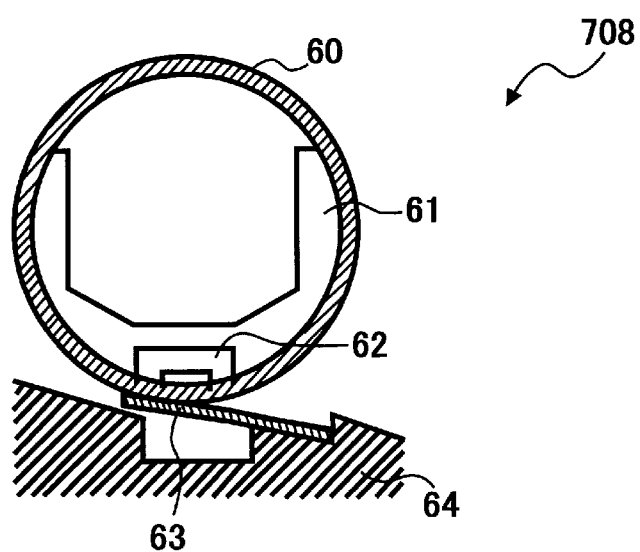
FIG. 31 is an illustration for explaining further another fixing apparatus, wherein the fixing apparatus uses a fixing film member.

FIG. 31 shows a fixing unit 708 according to another preferred embodiment. The fixing unit 708 of FIG. 31 includes a cylindrically-formed fixing film 60, a film supporting bracket 61, a heater 62, a sheet-shaped pressing member 63, and a frame 64. The film supporting bracket 61 supports the fixing film 60 from the inside of the fixing film 60. The heater 62 is fixed to the film supporting bracket 61. The pressing member 63 is held with its fixing side on the frame 64 so that the free side of the pressing member 63 is brought to contact under pressure with the fixing film 60.

The fixing side of the pressing member 63 is upstream from the heater 62 in the sheet transportation passage and the free side of the pressing member 63 receives heat from the heater 62 via the fixing film 60.

With this structure, the fixing film 60 rotated by a driving mechanism (not shown) causes the recording sheet to advance to the position of the heater 62 and to pass through the nip area formed between the fixing film 60 and the pressing member 63. Thereby, the recording sheet is subjected to heat and pressure and consequently the toner image is fixed on the recording sheet.

The pressing member of FIGS. 30 and 31 may be formed in a sheet shape and include a heat-resistant member having a property of heat-resistance around a predetermined fixing temperature. Such a member may be made of a fluoride resin such as PFA (per-fluoro-alkoxy), PTFE (poly-tetra-fluro-ethylene), or FEP (fluoro-ethylene-propylene), heat-resistant resin such as polyimide, a metal plate such as a stainless steel plate, a copper plate, or the like, or heat-resistant member having a layer coated with a fluoride resin.

Numerous additional modifications and variations of the present invention are possible in light of the above teachings. It is therefore to be understood that within the scope of the appended claims, the present invention may be practiced otherwise than as specifically described herein.

This document is based on Japanese patent applications, No. JPAP2000-199543 filed on Jun. 30, 2000, No. JPAP2000-199745 filed on Jun. 30, 2000, No. JPAP2000-199550 filed on Jun. 30, 2000, and No. JPAP2001-160352 filed on May 29, 2001, in the Japanese Patent Office, the entire contents of which are incorporated by reference herein.

What is claimed as new and is desired to be secured by Letters Patent of the United States is:

1. A fixing apparatus, comprising:
  a fixing roller including an inner heater;
  a base including a mounting portion upstream from said fixing roller in a sheet transportation direction; and
  a sheet-shaped pressing member including a fixing side which is fixed to said mounting portion of said base and a free side downstream from said fixing side in the sheet transportation direction, said free side contacting said fixing roller with an upper surface under pressure to form a nip area, said sheet-shaped pressing member having leaf spring characteristics so as not to require use of an additional spring,
  wherein a recording sheet having a toner image thereon passes through said nip area formed between said fixing roller and said pressing member so as to be subjected to heat and pressure at said nip area.

2. A fixing apparatus as defined in claim 1, wherein said mounting portion of said base is formed to have a plane surface so that a plane including said plane surface passes through a lower portion of said fixing roller.

3. A fixing apparatus as defined in claim 2, wherein said base comprises a guide portion for guiding said recording sheet to said mounting portion and said fixing roller.

4. A fixing apparatus as defined in claim 3, wherein said guide portion comprises a guide surface which forms a step relative to said plane of said mounting portion.

5. A fixing apparatus as defined in claim 1, wherein said pressing member has a length in the sheet transportation direction such that an edge of the free side is downstream from said nip area.

6. A fixing apparatus as defined in claim 1, wherein a surface of said pressing member contacting said fixing roller is formed in a cylindrical shape having a curvature matching to that of said fixing roller.

7. A fixing apparatus as defined in claim 6, wherein a plane of said pressing member upstream from the nip area is slanted on a tangent line at an edge point of the nip area at the upstream side thereof in the sheet transportation direction.

8. A fixing apparatus as defined in claim 6, wherein a plane of said pressing member downstream from the nip area is slanted on a tangent line, or a line away from said fixing roller, at an edge point of the nip area in the downstream side thereof in the sheet transportation direction.

9. A fixing apparatus as defined in claim 1, wherein said pressing member is made of resin including fluoride resin.

10. A fixing apparatus as defined in claim 1, wherein said pressing member is made of resin including polyimide.

11. A fixing apparatus as defined in claim 1, wherein said pressing member comprises a heat resistant plate member coated with a fluoride resin.

12. A fixing apparatus as defined in claim 11, wherein said heat resistant plate member has a property for storing heat.

13. A fixing apparatus as defined in claim 1, wherein said pressing member comprises a foam member.

14. A fixing apparatus as defined in claim 1, wherein said pressing member comprises an anti-static member.

15. A fixing apparatus as defined in claim 14, wherein said anti-static member includes carbon particles.

16. A fixing apparatus as defined in claim 14, wherein said pressing member comprises a polymeric material including PFA and carbon particles in a weight ratio of from approximately 1.2% to approximately 6.4%.

17. A fixing apparatus as defined in claim 14, wherein said pressing member has an electrical resistivity value of $10^{10}$ $\Omega$cm or less.

18. A fixing apparatus as defined in claim 1, wherein said pressing member comprises a metal member.

19. A fixing apparatus as defined in claim 1, wherein said pressing member comprises a low electrical resistance member.

20. A fixing apparatus as defined in claim 19, wherein said pressing member is electrically isolated.

21. A fixing apparatus as defined in claim 1, wherein said pressing member comprises a surface including a plurality of slits.

22. A fixing apparatus as defined in claim 1, wherein said free side of said pressing member is deburred.

23. A fixing apparatus as defined in claim 1, wherein said fixing roller, said pressing member, and said mounting portion are arranged in a single unit so that said apparatus is detachable from an image forming apparatus after an installation.

24. A fixing apparatus as defined in claim 1, wherein said pressing member is detachably secured to said mounting portion of said base.

25. A fixing apparatus as defined in claim 24, wherein said pressing member is fixed to said mounting portion with detachable fixing members at both ends, out of a sheet transportation passage, of said pressing member in a longitudinal direction.

26. A fixing apparatus as defined in claim 25, wherein said mounting portion comprises holding portions for holding both edges of said pressing member.

27. A fixing apparatus as defined in claim 1, wherein said base is made of metal plates.

28. A fixing apparatus as defined in claim 1, wherein said base is molded.

29. A fixing apparatus as defined in claim 28, wherein said base is molded such that a holder for rotatably holding said fixing roller and said mounting portion are integrated with said base into a single piece unit.

30. A fixing apparatus, comprising:
a fixing roller including an inner heater;
a base including a mounting portion upstream from said fixing roller in a sheet transportation direction;
a sheet-shaped pressing member including a fixing side which is fixed to said mounting portion of said base and a free side downstream from said fixing side in the sheet transportation direction, said free side contacting said fixing roller with an upper surface under pressure to form a nip area; and
a stopper for limiting a vertical movement of said pressing member, said stopper being provided at a position of said base downstream from said nip area in the sheet transportation direction so as to contact said pressing member from its back side,
wherein a recording sheet having a toner image thereon passes through said nip area formed between said fixing roller and said pressing member so as to be subjected to heat and pressure at said nip area.

31. A fixing apparatus as defined in claim 30, wherein said stopper is movable to adjust a vertical position of said pressing member.

32. A fixing apparatus, comprising:
a fixing roller including an inner heater;
a base including a mounting portion upstream from said fixing roller in a sheet transportation direction; and
a sheet-shaped pressing member including a fixing side which is fixed to said mounting portion of said base and a free side downstream from said fixing side in the sheet transportation direction, said free side contacting said fixing roller with an upper surface under pressure to form a nip area,
wherein a recording sheet having a toner image thereon passes through said nip area formed between said fixing roller and said pressing member so as to be subjected to heat and pressure at said nip area,
wherein said pressing member comprises a surface including a plurality of projections and depressions, said surface contacting said fixing roller, and wherein said plurality of projections and depressions are slanted relative to the sheet transportation direction.

33. A fixing apparatus, comprising:
a fixing roller including an inner heater;
a base including a mounting portion upstream from said fixing roller in a sheet transportation direction; and
a sheet-shaped pressing member including a fixing side which is fixed to said mounting portion of said base and a free side downstream from said fixing side in the sheet transportation direction, said free side contacting said fixing roller with an upper surface under pressure to form a nip area,
wherein a recording sheet having a toner image thereon passes through said nip area formed between said fixing roller and said pressing member so as to be subjected to heat and pressure at said nip area, and
wherein said pressing member is thinner at said nip area than at other portion thereof.

34. A fixing apparatus, comprising:
a fixing roller including an inner heater;
a base including a mounting portion upstream from said fixing roller in a sheet transportation direction; and
a sheet-shaped pressing member including a fixing side which is fixed to said mounting portion of said base and a free side downstream from said fixing side in the sheet transportation direction, said free side contacting said fixing roller with an upper surface under pressure to form a nip area,
wherein a recording sheet having a toner image thereon passes through said nip area formed between said fixing roller and said pressing member so as to be subjected to heat and pressure at said nip area, and
wherein said pressing member comprises a plurality of grooves formed in a main scanning direction in a back surface opposite to said nip area.

35. A fixing apparatus, comprising:
a fixing roller including an inner heater;
a base including a mounting portion upstream from said fixing roller in a sheet transportation direction; and
a sheet-shaped pressing member including a fixing side which is fixed to said mounting portion of said base and a free side downstream from said fixing side in the sheet transportation direction, said free side contacting said fixing roller with an upper surface under pressure to form a nip area,
wherein a recording sheet having a toner image thereon passes through said nip area formed between said fixing roller and said pressing member so as to be subjected to heat and pressure at said nip area, and
wherein said pressing member comprises a plurality of holes in a surface thereof downstream from said nip area in the sheet transportation direction.

36. A fixing apparatus, comprising:
a fixing roller including an inner heater;
a base including a mounting portion upstream from said fixing roller in a sheet transportation direction; and
a sheet-shaped pressing member including a fixing side which is fixed to said mounting portion of said base and a free side downstream from said fixing side in the sheet transportation direction, said free side contacting said fixing roller with an upper surface under pressure to form a nip area,
wherein a recording sheet having a toner image thereon passes through said nip area formed between said fixing roller and said pressing member so as to be subjected to heat and pressure at said nip area, and wherein said mounting portion comprises edge portions different in length in the sheet transportation direction in accordance with a distribution of temperature such that an edge portion where the temperature is low is extended more than another edge portion where the temperature is high.

37. A fixing apparatus, comprising:

a fixing roller including an inner heater;

a base including a mounting portion upstream from said fixing roller in a sheet transportation direction;

a sheet-shaped pressing member including a fixing side which is fixed to said mounting portion of said base and a free side downstream from said fixing side in the sheet transportation direction, said free side contacting said fixing roller with an upper surface under pressure to form a nip area; and an adjusting mechanism for adjusting a fixing position of said pressing member so as to change said nip area in the surface of said pressing member, wherein a recording sheet having a toner image thereon passes through said nip area formed between said fixing roller and said pressing member so as to be subjected to heat and pressure at said nip area.

38. A fixing apparatus, comprising:

a plurality of rollers, at least one of which contains a heater;

a fixing belt extended under tension among said plurality of rollers, said fixing belt being cyclically moved by rotation of said plurality of rollers; and a sheet-shaped pressing member including a fixing side which is fixed and a free side downstream from said fixing side in a sheet transportation direction, said free side contacting said fixing belt with an upper surface under pressure to form a nip area, said sheet-shaped pressing member having leaf spring characteristics so as not to require use of an additional spring, wherein a recording sheet having a toner image thereon passes through said nip area formed between said fixing belt and said pressing member so as to be subjected to heat and pressure in said nip area.

39. A fixing apparatus, comprising:

roller means including an inner heater;

base means including a mounting portion upstream from said roller means in a sheet transportation direction; and pressing means for pressing said roller means, said pressing means being formed in a sheet shape and including a fixing side which is fixed to said mounting portion of said base means and a free side downstream from said fixing side in the sheet transportation direction, said free side contacting said roller means with an upper surface under pressure to form a nip area, said pressing means having leaf spring characteristics so as not to require use of an additional spring, wherein a recording sheet having a toner image thereon passes through said nip area formed between said roller means and said pressing means so as to be subjected to heat and pressure at said nip area and said toner image is fixed on the recording sheet.

40. A fixing apparatus as defined in claim 39, wherein said mounting portion of said base means is formed to have a plane surface so that a plane including said plane surface passes through a lower portion of said roller means.

41. A fixing apparatus as defined in claim 40, wherein said base means comprises a guide portion for guiding said recording sheet to said mounting portion and said roller means.

42. A fixing apparatus as defined in claim 41, wherein said guide portion comprising a guide surface which forms a step relative to said plane of said mounting portion.

43. A fixing apparatus as defined in claim 39, wherein said pressing means has a length in the sheet transportation direction such that an edge of the free side is downstream from said nip area.

44. A fixing apparatus as defined in claim 39, wherein a surface of said pressing means contacting said roller means is formed in a cylindrical shape having a curvature matching that of said roller means.

45. A fixing apparatus as defined in claim 44, wherein a plane of said pressing means upstream from the nip area is slanted on a tangent line at an edge point of the nip area in the upstream side thereof in the sheet transportation direction.

46. A fixing apparatus as defined in claim 44, wherein a plane of said pressing means downstream from the nip area is slanted on a tangent line, or a line away from said roller means, at an edge point of the nip area in the downstream side thereof in the sheet transportation direction.

47. A fixing apparatus as defined in claim 39, wherein said pressing means is made of resin including fluoride resin.

48. A fixing apparatus as defined in claim 39, wherein said pressing means is made of resin including polyimide.

49. A fixing apparatus as defined in claim 39, wherein said pressing means comprises heat resistant plate means coated with a fluoride resin.

50. A fixing apparatus as defined in claim 49, wherein said heat resistant plate means has a property for storing heat.

51. A fixing apparatus as defined in claim 39, wherein said pressing means comprises foam means.

52. A fixing apparatus as defined in claim 39, wherein said pressing means contains anti-static means.

53. A fixing apparatus as defined in claim 52, wherein said anti-static means includes carbon particles.

54. A fixing apparatus as defined in claim 52, wherein said pressing means comprises a polymeric material including PFA and carbon particles in a weight ratio of from approximately 1.2% to approximately 6.4%.

55. A fixing apparatus as defined in claim 52, wherein said pressing means has a resistivity value of $10^{10}$ $\Omega$cm or less.

56. A fixing apparatus as defined in claim 39, wherein said pressing means comprises metal means.

57. A fixing apparatus as defined in claim 39, wherein said pressing means comprises low electrical resistance means.

58. A fixing apparatus as defined in claim 57, wherein said pressing means is electrically isolated.

59. A fixing apparatus as defined in claim 39, wherein said pressing means comprises a surface including a plurality of slits.

60. A fixing apparatus as defined in claim 39, wherein said free side of said pressing means is deburred.

61. A fixing apparatus as defined in claim 39, wherein said base means is made of metal plates.

62. A fixing apparatus as defined in claim 39, wherein said base means is molded.

63. A fixing apparatus as defined in claim 62, wherein said base means is molded so as to form holder means for rotatably holding said roller means and said mounting portion in a single piece unit.

64. A fixing apparatus as defined in claim 39, wherein said roller means, said pressing means, and said mounting portion are arranged in a single unit so that said apparatus is detachable from an image forming apparatus after an installation.

65. A fixing apparatus as defined in claim 39, wherein said pressing means is detachably secured to said mounting portion of said base means.

66. A fixing apparatus as defined in claim 65, wherein said pressing means is fixed to said mounting portion with detachable roller means at both ends, out of a sheet transportation passage, of said pressing member in a longitudinal direction.

67. A fixing apparatus as defined in claim 66, wherein said mounting portion comprises holding portions for holding both edges of said pressing means.

68. A fixing apparatus, comprising:

roller means including an inner heater;

base means including a mounting portion upstream from said roller means in a sheet transportation direction;

pressing means for pressing said roller means, said pressing means being formed in a sheet shape and including a fixing side which is fixed to said mounting portion of said base means and a free side downstream from said fixing side in the sheet transportation direction, said free side contacting said roller means with an upper surface under pressure to form a nip area; and stopping means for limiting a vertical movement of said pressing means, said stopping means being provided at a position of said base means downstream from said nip area in the sheet transportation direction so as to contact said pressing means from a back side, wherein a recording sheet having a toner image thereon passes through said nip area formed between said roller means and said pressing means so as to be subjected to heat and pressure at said nip area and said toner image is fixed on the recording sheet.

69. A fixing apparatus as defined in claim 68, wherein said stopping means is movable to adjust a vertical position of said pressing means.

70. A fixing apparatus, comprising:

roller means including an inner heater;

base means including a mounting portion upstream from said roller means in a sheet transportation direction; and pressing means for pressing said roller means, said pressing means being formed in a sheet shape and including a fixing side which is fixed to said mounting portion of said base means and a free side downstream from said fixing side in the sheet transportation direction, said free side contacting said roller means with an upper surface under pressure to form a nip area, wherein a recording sheet having a toner image thereon passes through said nip area formed between said roller means and said pressing means so as to be subjected to heat and pressure at said nip area and said toner image is fixed on the recording sheet, wherein said pressing means comprises a surface including a plurality of projections and depressions, said surface contacting said roller means and wherein said plurality of projections and depressions are slanted relative to the sheet transportation direction.

71. A fixing apparatus, comprising:

roller means including an inner heater;

base means including a mounting portion upstream from said roller means in a sheet transportation direction; and pressing means for pressing said roller means, said pressing means being formed in a sheet shape and including a fixing side which is fixed to said mounting portion of said base means and a free side downstream from said fixing side in the sheet transportation direction, said free side contacting said roller means with an upper surface under pressure to form a nip area, wherein a recording sheet having a toner image thereon passes through said nip area formed between said roller means and said pressing means so as to be subjected to heat and pressure at said nip area and said toner image is fixed on the recording sheet, and wherein said pressing means is thinner at said nip area than at another portion thereof.

72. A fixing apparatus, comprising:

roller means including an inner heater;

base means including a mounting portion upstream from said roller means in a sheet transportation direction; and pressing means for pressing said roller means, said pressing means being formed in a sheet shape and including a fixing side which is fixed to said mounting portion of said base means and a free side downstream from said fixing side in the sheet transportation direction, said free side contacting said roller means with an upper surface under pressure to form a nip area, wherein a recording sheet having a toner image thereon pas[]es through said nip area formed between said roller means and said pressing means so as to be subjected to heat and pressure at said nip area and said toner image is fixed on the recording sheet, and wherein said pressing means comprises a plurality of grooves formed in a main scanning direction in a back surface opposite to said nip area.

73. A fixing apparatus, comprising:

roller means including an inner heater;

base means including a mounting portion upstream from said roller means in a sheet transportation direction; and pressing means for pressing said roller means, said pressing means being formed in a sheet shape and including a fixing side which is fixed to said mounting portion of said base means and a free side downstream from said fixing side in the sheet transportation direction, said free side contacting said roller means with an upper surface under pressure to form a nip area, wherein a recording sheet having a toner image thereon passes through said nip area formed between said roller means and said pressing means so as to be subjected to heat and pressure at said nip area and said toner image is fixed on the recording sheet, and wherein said pressing means comprises a plurality of holes in a surface thereof downstream from said nip area in the sheet transportation direction.

74. A fixing apparatus, comprising:

roller means including an inner heater;

base means including a mounting portion upstream from said roller means in a sheet transportation direction; and pressing means for pressing said roller means, said pressing means being formed in a sheet shape and including a fixing side which is fixed to said mounting portion of said base means and a free side downstream from said fixing side in the sheet transportation direction, said free side contacting said roller means with an upper surface under pressure to form a nip area, wherein a recording sheet having a toner image thereon passes through said nip area formed between said roller means and said pressing means so as to be subjected to heat and pressure at said nip area and said toner image is fixed on the recording sheet, and wherein said mounting portion comprises edge portions different in length in the sheet transportation direction in accordance with a distribution of temperature such that an edge portion where the temperature is low is extended more than another edge portion where the temperature is high.

75. A fixing apparatus, comprising:

roller means including an inner heater;

base means including a mounting portion upstream from said roller means in a sheet transportation direction;

pressing means for pressing said roller means, said pressing means being formed in a sheet shape and including a fixing side which is fixed to said mounting portion of said base means and a free side downstream from said fixing side in the sheet transportation direction, said free side contacting said roller means with an upper surface under pressure to form a nip area; and adjusting means for adjusting a fixing position of said pressing means so as to change said nip area in the surface of said pressing means, wherein a recording sheet having a toner image thereon passes through said nip area formed between said roller means and said pressing means so as to be subjected to heat and pressure at said nip area and said toner image is fixed on the recording sheet.

76. A fixing apparatus, comprising:

a plurality of roller means, at least one of which contains heating means;

belt means extended under tension among said plurality of roller means, said belt means being cyclically moved by rotation of said plurality of roller means; and pressing means for pressing said belt means, said pressing means being formed in a sheet shape and including a fixing side which is fixed and a free side downstream from said fixing side in a sheet transportation direction, said free side contacting said fixing belt with an upper surface under pressure to form a nip area, said pressing means having leaf spring characteristics so as not to require use of an additional spring, wherein a recording sheet having a toner image thereon passes through said nip area formed between said belt means and said pressing means so as to be subjected to heat and pressure in said nip area.

77. An image forming apparatus, comprising:

a fixing mechanism for fixing a toner image on a recording sheet, said fixing mechanism comprising:

a plurality of rollers, at least one of which contains a heater;

a belt extended under tension among said plurality of rollers, said belt being cyclically moved by rotation of said plurality of rollers; and a pressing member for pressing said belt, said pressing member being formed in a sheet shape and including a fixing side which is fixed and a free side downstream from said fixing side in a sheet transportation direction, said free side contacting said belt with an upper surface under pressure to form a nip area, said pressing member having leaf spring characteristics so as not to require use of an additional spring, wherein a recording sheet having a toner image thereon passes through said nip area formed between said belt and said pressing member so as to be subjected to heat and pressure in said nip area.

78. An image forming apparatus, comprising:

fixing means for fixing a toner image on a recording sheet, said fixing means comprising:

a plurality of roller means, at least one of which contains heating means;

belt means extended under tension among said plurality of roller means, said belt means being cyclically moved by rotation of said plurality of roller means; and pressing means for pressing said belt means, said pressing means being formed in a sheet shape and including a fixing side which is fixed and a free side downstream from said fixing side in a sheet transportation direction, said free side contacting said belt means with its upper surface under pressure to form a nip area, said pressing means having leaf spring characteristics so as not to require use of an additional spring, wherein a recording sheet having a toner image thereon passes through said nip area formed between said belt means and said pressing means so as to be subjected to heat and pressure in said nip area.

79. A method of toner image fixing, comprising:

providing a base including a mounting portion;

arranging a roller downstream from said plane mounting portion in a sheet transportation direction, said roller containing an inner heater for heating said roller;

mounting an elastic plate including a fixing side and a free side opposite to and downstream from said fixing side in the sheet transportation direction such that said fixing side is fixed to said mounting portion and said free side is brought in contact with said roller under pressure with an upper surface of said free side so as to form a nip area between said roller and said elastic plate, said elastic plate having leaf spring characteristics so as not to require use of an additional spring;

rotating said roller; and transporting a recording sheet having a toner image thereon into said nip area so as to be subjected to heat and pressure in said nip area.

80. A method as defined in claim 79, including causing mounting portion of said base to have a plane surface so that a plane including said plane surface passes through a lower portion of said roller.

81. A method as defined in claim 80, including forming said base with a guide portion for guiding said recording sheet to said mounting portion and said roller.

82. A method as defined in claim 81, including forming said guide portion with a guide surface which forms a step relative to said plane of said mounting portion.

83. A method as defined in claim 79, including locating an edge of the free side of said elastic plate downstream from the nip area in the sheet transportation direction.

84. A method as defined in claim 79, including forming a surface of said elastic plate contacting said roller is formed in a cylindrical shape, with a curvature matching to that of said roller.

85. A method as defined in claim 84, including slanting a plane of said elastic plate upstream from the nip area on a tangent line at an edge point of the nip area in the upstream side thereof in the sheet transportation direction.

86. A method as defined in claim 84, including slanting a plane of said elastic plate downstream from the nip area is slanted on a tangent line, or a line away from said roller, at an edge point of the nip area in the downstream side thereof in the sheet transportation direction.

87. A method as defined in claim 79, including making said elastic plate of resin including fluoride resin.

88. A method as defined in claim 79, including making said elastic plate of resin including polyimide.

89. A method as defined in claim 88, including providing said heat resistant plate with heat storing properties.

90. A method as defined in claim 79, including making said elastic plate a heat resistant plate coated with a fluoride resin.

91. A method as defined in claim 79, including making at least a part of said elastic plate of foam.

92. A method as defined in claim 79, including causing said elastic plate to contain an anti-static member.

93. A method as defined in claim 92, including causing said anti-static member to include carbon particles.

94. A method as defined in claim 92, including causing said elastic plate to comprise a polymeric material including PFA and carbon particles in a weight ratio of from approximately 1.2% to approximately 6.4%.

95. A method as defined in claim 92, including causing said elastic plate to have a resistivity of $10^{10}$ Ωcm or less.

96. A method as defined in claim 79, including causing said elastic plate to comprise a metal member.

97. A method as defined in claim 79, including causing said elastic plate to comprise a low electrical resistance member.

98. A member as defined in claim 97, including making said elastic plate electrically isolated.

99. A method as defined in claim 79, including causing said elastic plate to comprise a surface including a plurality of slits.

100. A method as defined in claim 79, including deburring said free side of said elastic plate.

101. A method as defined in claim 79, including making said base of metal plates.

102. A method as defined in claim 79, including molding said base.

103. A method as defined in claim 102, including forming said base with a holder for rotatably holding said roller and with said mounting portion in a single piece unit.

104. A method as defined in claim 79, including making said roller, said elastic plate, and said mounting portion in a single unit so that said apparatus is detachable from an image forming apparatus after an installation.

105. A method as defined in claim 79, including detachably securing said elastic plate to said mounting portion of said base.

106. A method as defined in claim 105, including securing said elastic plate to said mounting portion with detachable roller at both ends, out of a sheet transportation passage, of said pressing member in a longitudinal direction.

107. A method as defined in claim 106, including forming said mounting portion with holding portions for holding both edges of said elastic plate.

108. A method of toner image fixing, comprising:
providing a base including a mounting portion;
arranging a roller downstream from said plane mounting portion in a sheet transportation direction, said roller containing an inner heater for heating said roller;
mounting an elastic plate including a fixing side and a free side opposite to and downstream from said fixing side in the sheet transportation direction such that said fixing side is fixed to said mounting portion and said free side is brought in contact with said roller under pressure with an upper surface of said free side so as to form a nip area between said roller and said elastic plate;
rotating said roller;
transporting a recording sheet having a toner image thereon into said nip area so as to be subjected to heat and pressure in said nip area; and
providing a stopper for limiting a vertical movement of said elastic plate, said stopper being provided at a position downstream from said nip area in the sheet transportation direction so as to contact said elastic plate from a back side.

109. A method as defined in claim 108, including moving said stopper to adjust a vertical position of said elastic plate.

110. A method of toner image fixing, comprising:
providing a base including a mounting portion;
arranging a roller downstream from said plane mounting portion in a sheet transportation direction, said roller containing an inner heater for heating said roller;
mounting an elastic plate including a fixing side and a free side opposite to and downstream from said fixing side in the sheet transportation direction such that said fixing side is fixed to said mounting portion and said free side is brought in contact with said roller under pressure with an upper surface of said free side so as to form a nip area between said roller and said elastic plate;
rotating said roller;
transporting a recording sheet having a toner image thereon into said nip area so as to be subjected to heat and pressure in said nip area;
causing said elastic plate to comprise a surface including a plurality of projections and depressions, said surface contacting said roller; and
making said plurality of projections and depressions slanted relative to the sheet transportation direction.

111. A method of toner image fixing, comprising:
providing a base including a mounting portion;
arranging a roller downstream from said plane mounting portion in a sheet transportation direction, said roller containing an inner heater for heating said roller;
mounting an elastic plate including a fixing side and a free side opposite to and downstream from said fixing side in the sheet transportation direction such that said fixing side is fixed to said mounting portion and said free side is brought in contact with said roller under pressure with an upper surface of said free side so as to form a nip area between said roller and said elastic plate;
rotating said roller;
transporting a recording sheet having a toner image thereon into said nip area so as to be subjected to heat and pressure in said nip area; and
making said elastic plate thinner at said nip area than at another portion thereof.

112. A method of toner image fixing, comprising:
providing a base including a mounting portion;
arranging a roller downstream from said plane mounting portion in a sheet transportation direction, said roller containing an inner heater for heating said roller;
mounting an elastic plate including a fixing side and a free side opposite to and downstream from said fixing side in the sheet transportation direction such that said fixing side is fixed to said mounting portion and said free side is brought in contact with said roller under pressure with an upper surface of said free side so as to form a nip area between said roller and said elastic plate;

rotating said roller;

transporting a recording sheet having a toner image thereon into said nip area so as to be subjected to heat and pressure in said nip area; and causing said elastic plate to comprise a plurality of grooves formed in a main scanning direction in a back surface opposite to said nip area.

113. A method of toner image fixing, comprising:

providing a base including a mounting portion;

arranging a roller downstream from said plane mounting portion in a sheet transportation direction, said roller containing an inner heater for heating said roller;

mounting an elastic plate including a fixing side and a free side opposite to and downstream from said fixing side in the sheet transportation direction such that said fixing side is fixed to said mounting portion and said free side is brought in contact with said roller under pressure with an upper surface of said free side so as to form a nip area between said roller and said elastic plate;

rotating said roller;

transporting a recording sheet having a toner image thereon into said nip area so as to be subjected to heat and pressure in said nip area; and forming in said elastic plate a plurality of holes in a surface thereof downstream from said nip area in the sheet transportation direction.

114. A method of toner image fixing, comprising:

providing a base including a mounting portion;

arranging a roller downstream from said plane mounting portion in a sheet transportation direction, said roller containing an inner heater for heating said roller;

mounting an elastic plate including a fixing side and a free side opposite to and downstream from said fixing side in the sheet transportation direction such that said fixing side is fixed to said mounting portion and said free side is brought in contact with said roller under pressure with an upper surface of said free side so as to form a nip area between said roller and said elastic plate;

rotating said roller;

transporting a recording sheet having a toner image thereon into said nip area so as to be subjected to heat and pressure in said nip area; and forming said mounting portion with edge portions different in length in the sheet transportation direction in accordance with a distribution of temperature such that an edge portion where the temperature is low is extended more than another edge portion where the temperature is high.

115. A method of toner image fixing, comprising:

providing a base including a mounting portion;

arranging a roller downstream from said plane mounting portion in a sheet transportation direction, said roller containing an inner heater for heating said roller;

mounting an elastic plate including a fixing side and a free side opposite to and downstream from said fixing side in the sheet transportation direction such that said fixing side is fixed to said mounting portion and said free side is brought in contact with said roller under pressure with an upper surface of said free side so as to form a nip area between said roller and said elastic plate;

adjusting a fixing position of said elastic plate so as to change said nip area in the surface of said elastic plate rotating said roller;

transporting a recording sheet having a toner image thereon into said nip area so as to be subjected to heat and pressure in said nip area.

116. A method of forming and fixing an image on a sheet and fixing the image with heat under pressure comprising:

forming an image on a sheet; and moving the sheet through a nip between a heated member and a sheet-shaped resilient pressure member that presses the sheet against the heated member to fix said image, said sheet-shaped resilient pressure member having leaf spring characteristics so as not to require use of an additional spring.

117. A method as in claim 116 including using a roller as said heated member.

118. A method as in claim 116 including using as said heat member a belt supported by a plurality of rollers at least one of which is heated.

119. A method as in claim 116 including supporting said pressure member at a portion thereof upstream of said nip relative to the direction of motion of said sheet through said nip.

120. A method as in claim 119 including leaving unsupported a portion of said pressure member extending downstream of said nip relative to said direction of sheet motion.

121. An apparatus for forming an image on a sheet and fixing the image with heat under pressure comprising:

at least one image forming unit forming an image on a sheet;

at least one heated member; and at least one resilient, sheet-shaped pressure member mounted to press against the at least one heated member to form at least one nip, said resilient, sheet-shaped pressure member having leaf spring characteristics so as not to require use of an additional spring;

at least one sheet guide and feeder guiding a sheet with an image thereon from the at least one image forming unit to the at least one nip and feeding the sheet through the at least one nip;

said image on the sheet being fixed by heat under pressure in said feeding of the sheet through said at least one nip.

122. An apparatus as in claim 121 in which said heated member comprises a heated roller mounted for rotation as said sheet is fed through said nip, said resilient member pressing against said heated roller to form said nip.

123. An apparatus as in claim 121 in which said heated member comprises a plurality of rollers, at least one of which is heated, and a belt supported thereby for movement relative to said resilient member as the sheet is fed through said nip, said resilient member pressing against said belt to form said nip.

* * * * *